(12) United States Patent
Allen

(10) Patent No.: US 11,290,486 B1
(45) Date of Patent: Mar. 29, 2022

(54) ALLOCATING DEFECTIVE COMPUTING RESOURCES FOR HONEYPOT SERVICES

(71) Applicant: Amazon Technologies, Inc., Seattle, WA (US)

(72) Inventor: Nicholas Alexander Allen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 580 days.

(21) Appl. No.: 14/981,722

(22) Filed: Dec. 28, 2015

(51) Int. Cl.
*H04L 29/06* (2006.01)
*H04L 47/70* (2022.01)

(52) U.S. Cl.
CPC ........ *H04L 63/1491* (2013.01); *H04L 47/827* (2013.01); *H04L 63/1416* (2013.01)

(58) Field of Classification Search
CPC ............. H04L 63/1491; H04L 63/1416; H04L 47/827
USPC .......................................................... 726/23
See application file for complete search history.

(56) References Cited

U.S. PATENT DOCUMENTS

| | | | |
|---|---|---|---|
| 5,819,226 A | | 10/1998 | Gopinathan et al. |
| 5,996,075 A | * | 11/1999 | Matena ................. G06F 11/142 714/5.11 |
| 6,527,556 B1 | | 3/2003 | Koskinen |
| 6,836,888 B1 | * | 12/2004 | Basu ....................... G06F 21/57 713/164 |
| 7,032,114 B1 | * | 4/2006 | Moran .................. G06F 21/554 713/176 |
| 7,363,528 B2 | * | 4/2008 | Chan .................. H04L 63/1433 714/4.3 |
| 8,893,278 B1 | | 11/2014 | Chechik |
| 9,495,188 B1 | * | 11/2016 | Ettema ................ G06F 9/45533 |
| 9,602,536 B1 | * | 3/2017 | Brown, Jr ........... H04L 63/1491 |
| 9,621,421 B1 | * | 4/2017 | Tolentino ............ H04L 41/0816 |
| 2001/0000812 A1 | * | 5/2001 | Waldo .................... G06F 9/4411 709/225 |
| 2002/0046176 A1 | | 4/2002 | Seo et al. |
| 2002/0070981 A1 | | 6/2002 | Kida |
| 2002/0133721 A1 | | 9/2002 | Adjaoute |
| 2003/0200259 A1 | | 10/2003 | Tsuge |
| 2004/0172557 A1 | | 9/2004 | Nakae et al. |
| 2004/0250203 A1 | | 12/2004 | Yamada |
| 2005/0177635 A1 | * | 8/2005 | Schmidt .................... G06F 9/52 709/226 |
| 2006/0161982 A1 | * | 7/2006 | Chari ...................... G06F 21/53 726/23 |
| 2006/0268838 A1 | | 11/2006 | Larsson et al. |
| 2007/0073599 A1 | | 3/2007 | Perry et al. |
| 2007/0271614 A1 | * | 11/2007 | Capalik ............... H04L 63/1441 726/23 |

(Continued)

*Primary Examiner* — Jahangir Kabir
(74) *Attorney, Agent, or Firm* — Davis Wright Tremaine LLP

(57) ABSTRACT

The disclosure relates to provisioning honeypot computing services using computing resources in a defective computing resource pool. In one example, a computing system can generate a maliciousness score for a received resource allocation request, determine that the generated maliciousness score exceeds a maliciousness threshold and identify a computing resource in a defective resource pool that is eligible to satisfy the request. The system can then provision honeypot computing services to fulfill the request, using the identified computing resource in the defective resource pool.

20 Claims, 16 Drawing Sheets

(56) References Cited

U.S. PATENT DOCUMENTS

| | | |
|---|---|---|
| 2008/0046989 A1 | 2/2008 | Wahl |
| 2009/0044265 A1* | 2/2009 | Ghosh .................... G06F 21/552 726/14 |
| 2009/0328216 A1* | 12/2009 | Rafalovich ......... H04L 43/0876 726/23 |
| 2010/0169150 A1* | 7/2010 | Gremont .......... G06Q 10/06312 705/7.14 |
| 2011/0179487 A1 | 7/2011 | Lee |
| 2011/0264612 A1 | 10/2011 | Ryman-Tubb |
| 2012/0151585 A1* | 6/2012 | Lamastra ................ H04L 51/12 726/24 |
| 2012/0221730 A1* | 8/2012 | Oba ...................... G06F 9/5077 709/226 |
| 2013/0268520 A1 | 10/2013 | Fisher et al. |
| 2014/0096229 A1* | 4/2014 | Burns ................ H04L 63/1491 726/15 |
| 2014/0282936 A1* | 9/2014 | Fitzgerald ............... H04L 63/10 726/6 |
| 2015/0058983 A1* | 2/2015 | Zeitlin ................ H04L 63/1408 726/23 |
| 2015/0066573 A1 | 3/2015 | Damonte et al. |
| 2015/0121529 A1* | 4/2015 | Quinlan .............. H04L 63/1491 726/23 |
| 2015/0326588 A1* | 11/2015 | Vissamsetty ........ H04L 63/1491 726/23 |
| 2016/0029246 A1 | 1/2016 | Mishra et al. |
| 2016/0119377 A1* | 4/2016 | Goldberg ................ G06F 17/27 726/12 |
| 2016/0218933 A1* | 7/2016 | Porras .................... H04L 63/20 |

* cited by examiner

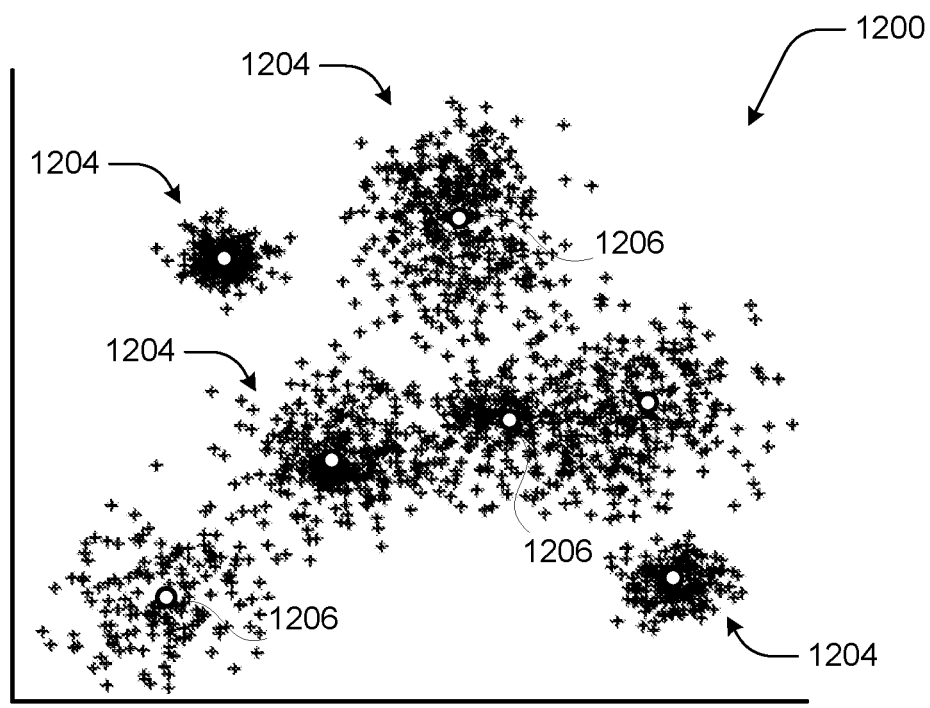
FIG. 12

ALLOCATING DEFECTIVE COMPUTING RESOURCES FOR HONEYPOT SERVICES

CROSS REFERENCE TO RELATED APPLICATION

This application incorporates by reference for all purposes the full disclosure of co-pending U.S. patent application Ser. No. 14/981,737, filed concurrently herewith, entitled "HONEYPOT COMPUTING SERVICES THAT INCLUDE SIMULATED COMPUTING RESOURCES" and co-pending U.S. patent application Ser. No. 14/981,752, filed concurrently herewith, entitled "FRAUD SCORE HEURISTIC FOR IDENTIFYING FRAUDULENT REQUESTS OR SETS OF REQUESTS."

BACKGROUND

A honeypot, in the context of computer network security, can include software and hardware resources that are intended detect, deflect, or counteract attempts at unauthorized use of information systems. In some examples, honeypots can include simulated network resources such as simulated virtual machines, simulated storage, and the like, but in other examples, real network resources can be a part of a honeypot. Some honeypots are designed to trick malicious users into believing that they are using or have access to legitimate resources or important data, when in reality the resources are simulated or the data that the malicious user has access to is not real. Additionally, honeypots can act as a decoy for malicious users. For example, a honeypot can provide a seemingly easy or attractive intrusion point into a network that acts as a distraction from other network vulnerabilities and locations of sensitive information.

Accordingly, with malicious users believing that they have been undetected and have access to resources and information of interest, the actions of these malicious users can be tracked and neutralized. For example, by allowing malicious users to act within honeypots can allow network administrators to learn about potential security risks of a network and gain information about malicious users that can be provided to law enforcement or can otherwise be used to stop these malicious users. However, while honeypots can be valuable tools for learning about, containing and deflecting malicious users, generating honeypot computing resources for malicious users can tie up valuable computing resources that could otherwise be used by legitimate users that deserve the availability of high quality computing resources that are able to scale as necessary. Moreover, a service provider that services customers by providing such computing services will often not receive payment for computing resources used by malicious users because many malicious users will not pay their bill or will pay using fraudulent payments that will eventually need to be reimbursed or voided.

BRIEF DESCRIPTION OF THE DRAWINGS

Various techniques will be described with reference to the drawings, in which:

FIG. 12 illustrates a set of requests being used to identify clusters that can be used as predictors of malicious user requests;

DETAILED DESCRIPTION

Figure 1:
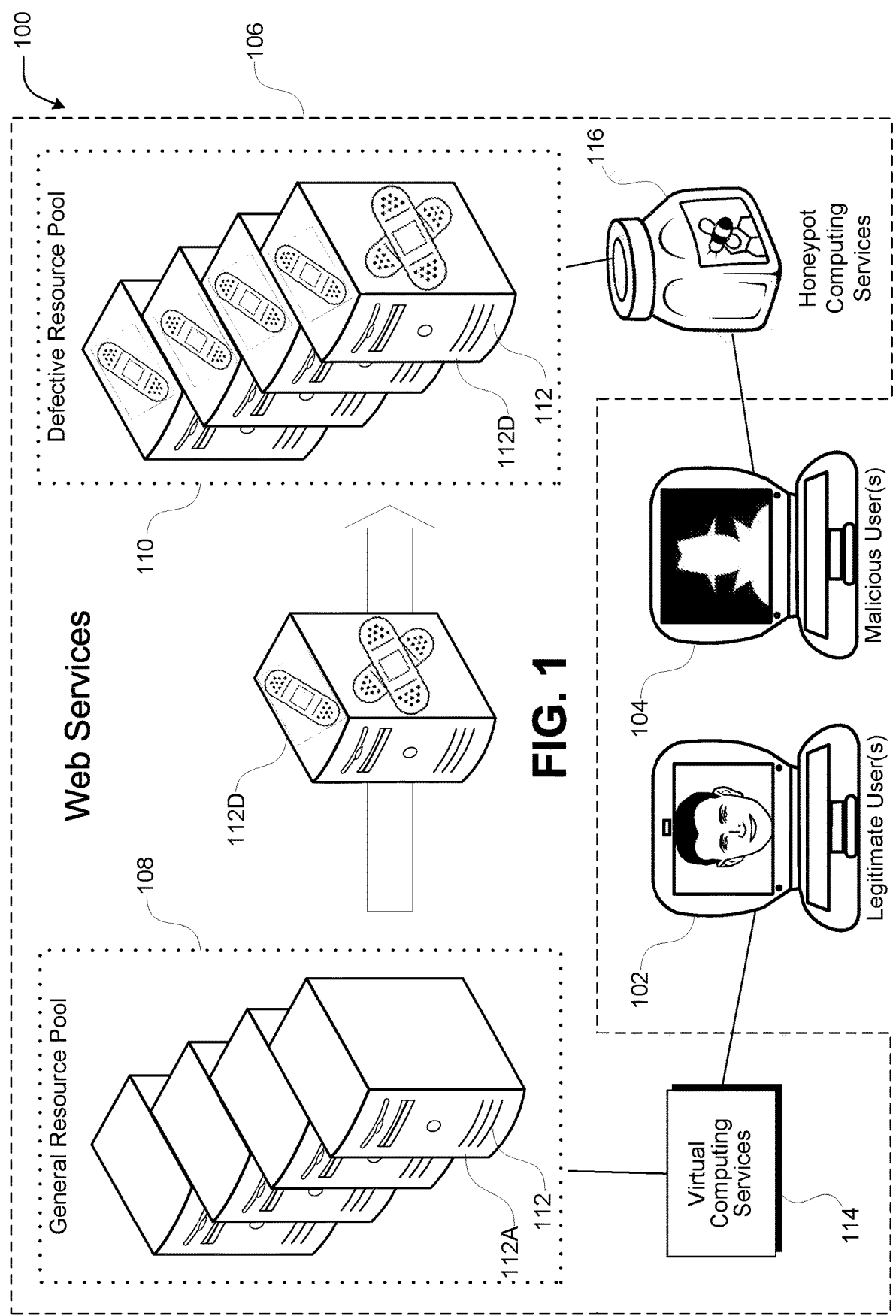
FIG. 1 illustrates an example operating environment including a plurality of legitimate user devices and a plurality of malicious user devices that are communicating with a web service system that include a general resource pool and a defective resource pool.

The following disclosure relates to determining whether a network user is malicious and provisioning honeypot computing services to malicious users so that they can be tracked, contained, and stopped. In various examples, providing computing services to legitimate users includes making high quality resources available to the user when the user desires and also allowing quickly scaling of resources when the need arises. Accordingly, to provide the best service to legitimate users, various techniques are employed to reserve computing resource capacity for the legitimate users by providing lower-quality computing resources (e.g., computing resources that have degraded performance as a result of needing service) to malicious users instead of allowing these malicious users to tie up precious resources that would be better allocated to legitimate users who deserve the best service.

In a virtual computing environment, for example, physical hosts are used to instantiate virtual machines for users. Where these physical hosts experience some performance degradation due to hardware faults, or the like, these defective resources can be allocated to a pool of defective resources that can be used to provide honeypot computing services to malicious users. Accordingly, cost-effective honeypots can be generated to observe and stop malicious users while maintaining a pool of top-performing resources that can be reserved for use by legitimate users.

Allocating a resource to a defective pool of resources can be triggered by receiving notification of a hardware fault associated with the resource and then determining that the resource is eligible for allocation to the defective pool. For example, the resource may not be eligible if it is so degraded that it is inoperable, or it may still be suitable for use in the general resource pool if the resources' degradation is minor. If appropriate, the resource can be allocated to the defective pool and an effective time to repair can be associated with the resource. For example, an effective time to repair can include a predicted time that it will take for a repair technician to diagnose an issue, receive and install replacement parts, or the like.

When a resource allocation request is received, such as a request to instantiate one or more virtual machine, the request can be scored for maliciousness and if the maliciousness score exceeds a threshold, then the system can determine if there are any eligible resources in the defective resource pool available to service the request and, when there are sufficient eligible resources in the defective resource pool, can allocate these defective resources to the malicious user.

Allocating these resources can include provisioning honeypot computing services that comprise real and/or simulated computing resources, including virtual hosts and memory services. Determining whether eligible resources are available to provision to the malicious user can include determining whether there are resources in the defective pool that meet the requirements of the request and whether the allocation would allow the resources to be released and available in time for scheduled for diagnosis or repair.

As a result of a malicious user having been detected, honeypot credentials (i.e., credentials tagged as honeypot credentials) can be provisioned to the user. In some examples, these honeypot credentials can be different than normal user credentials, or the credentials can be the same and the user can be flagged for honeypot credentials at the account level. Honeypot and normal (non-honeypot) credentials can distinguishable to a system that authenticates using the credentials and, as a result, the system can determine how to process a request made using the credentials. As discussed, honeypot credentials can provide an indication that some or all of a set of requested set of computing resources be providing using resources from a defective pool and/or provided in the form of a simulation where such resources are not actually provided. In various examples, regular or non-honeypot credentials can provide an indication to a system to allocate real computing resources from a general resource allocation pool, which can be the best resources available.

In some examples, various computing services such as virtual machines can be simulated with a simulation state database. Accordingly, instead of running computing services such as virtual machines when requested by the user, a simulation state database can be used to generate responses to user requests that simulate interactions with real computing resources (i.e., computing resources that perform requested/commanded operations as opposed to simulating performance of the requested/commanded operations). For example, where the user sends a mutating request while provisioned with honeypot services, the simulation state database can be updated and a response can be provided to the user that simulates a response that would be provided by real resources, such as virtual machines.

Mutating requests can include various requests to change or mutate a computing resource in some way, including instantiating the resource, updating the resource, reconfiguring the resource, terminating the resource, and the like. Similarly, where the user provides a query request, the simulation state database can be queried and a response can be provided to the user that simulates a response that would be provided to a query of real resources such as virtual machines. Query request can include various requests that do not change or mutate a computing resource in some way and instead include a request for information about a computing resource, such as the running status of the resource, name of the resource, memory allocation of the resource, and the like.

In some example techniques, user requests or sets of user requests (e.g., application program interface (API) calls), are evaluated to determine whether they are malicious or fraudulent by a fraud score heuristic. In various examples, fraud score heuristics can be a simple or complex algorithm for analyzing requests or sets of user requests and can be implemented on a hardware and/or software system. For example, a fraud score heuristic can use a pattern that corresponds to characteristics of malicious requests or sets of malicious requests.

Accordingly, in various examples, a fraud score heuristic is trained by extracting characteristics from training data that includes requests or sets of requests from malicious users. In one example, characteristics are extracted from a request or series of requests and a k-means algorithm can be used to identify one or more clusters of the characteristics, which can be represented in multidimensional space.

In addition to using known malicious requests to train a pattern or fraud heuristic, data or characteristics from non-malicious users can used as training data or as a filter for patterns that identify requests or sets of requests from malicious users. In one example, patterns for malicious and non-malicious requests or sets of requests can be identified, and the patterns for non-malicious requests or sets of requests can be subtracted from or otherwise used to bias or weight the pattern for malicious users so as to reduce the occurrence of false positives, when uncategorized user requests or sets of requests are analyzed.

As discussed in this disclosure, fraud, fraudulent use, a fraudulent user, maliciousness, malicious use, a malicious user, and similar terms can encompass actions and/or one or more users performing actions that are intended to perpetrate computer fraud, abuse, misuse, waste, access without authorization or exceeding authorized access, or related activities. Users can include one or more human operators and/or software programs such as bots, or the like. As discussed, fraud scores and fraud heuristics can relate to any such activities, users, or the like.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example operating environment 100 including one or more legitimate users 102 and one or more malicious user 104 that are communicating with a web service system 106 that includes a general resource pool 108 and a defective resource pool 110. In various examples, the legitimate user 102 and/or malicious user 104 can include a user operating any suitable user device including a laptop computer, desktop computer, smart phone, tablet computer, gaming device, heads-up display, wearable computer, home automation computer, or the like. Users may also be automated processes in some embodiments.

In various examples, the general resource pool 108 and defective resource pool 110 can include one or more computing resources 112. Some of these resources can be classified as defective resources 112D or classified as non-defective resources 112A. The computing resources 112 can include a server, physical host, or the like, configured to instantiate virtual or non-virtual machines. For example, the computing resources 112 can be configured to instantiate virtual computing services 114, honeypot computing resources 116, or the like.

Such computing resources 112 can be associated with, or in a given pool 108, 110 logically or physically. For example a set of computing resources 112 such as a plurality of servers can be present together in a server warehouse, or the like, and association with a given pool 108, 110 can be defined by a metadata tag or other identifier associated with each resource 112, with resources 112 of various pools being intermingled. Alternatively, resources 112 in a given resource pool 108, 110 can be physically located together.

As illustrated in FIG. 1, defective resources 112D can be transferred from the general resource pool 108 to the defective resource pool 110. In various examples, transferring defective resources 112D from the general resource pool 108 to the defective resource pool 110 can be a logical operation. In other words, transferring defective resources 112D from the general resource pool 108 to the defective resource pool 110 (or vice versa) can include changing an identifier, tag, metadata, or the like, associated with a given computing resource 112 such that the computing resource 112 is identified as being part of the defective resource pool 110. Alternatively, transferring resources 112 between pools 108, 110 can be a physical operation. For example, a human operator or robot can move a computing resource 112 form one location to another, which effectuates the transfer of the resource 112 from one pool to another.

Computing resource 112 can be identified as being defective for various suitable reasons, including one or more hardware components of the computing resource 112 not operating above a performance threshold. For example, a processor, hard drive, power supply, cable connections, network card, or the like, that is part of a computing resource 112 can have a performance issue that makes the computing resource 112 perform in a manner that not in conformity with quality assurance parameters of a service provider. However, in various examples, although defective resources 112 of a defective resource pool 106 may not be performing above a certain quality threshold, the defective resources 112 of a defective resource pool 106 may still be capable of instantiating honeypot computing services within certain defined parameters as discussed in more detail below.

As shown in FIG. 1, the general resource pool 108 of non-defective computing resources 112A can provide virtual computing services 114 to one or more legitimate user 102, which can include instantiation of one or more virtual machines, or the like. To maintain top performance for the one or more legitimate users 102, it can be beneficial to provide honeypot computing services 116, and the like, to malicious users 104 by using defective resources 112D from the defective resource pool 106 instead of from the general resource pool 108. In doing so, the activity of malicious users 104 may not affect the availability of top-performing computing resources 112 that may be assigned to the general resource pool 108.

As discussed in this disclosure, honeypot computing services 116 can include computing services that can allow a service provider to monitor actions of a malicious user 104, limit actions of a malicious user 104, quarantine a malicious user 104, track a malicious user 104, and the like. For example, honeypot computing services can include a malicious user monitoring service, a malicious user tracking service, a malicious user detection service, or the like. Such services can log actions performed by the malicious user and/or throttle computing resources being used by the malicious user. Additionally, as discussed below, honeypot computing services 116 can include the provisioning or use of simulated computing services, including a simulation state database.

Figure 2:
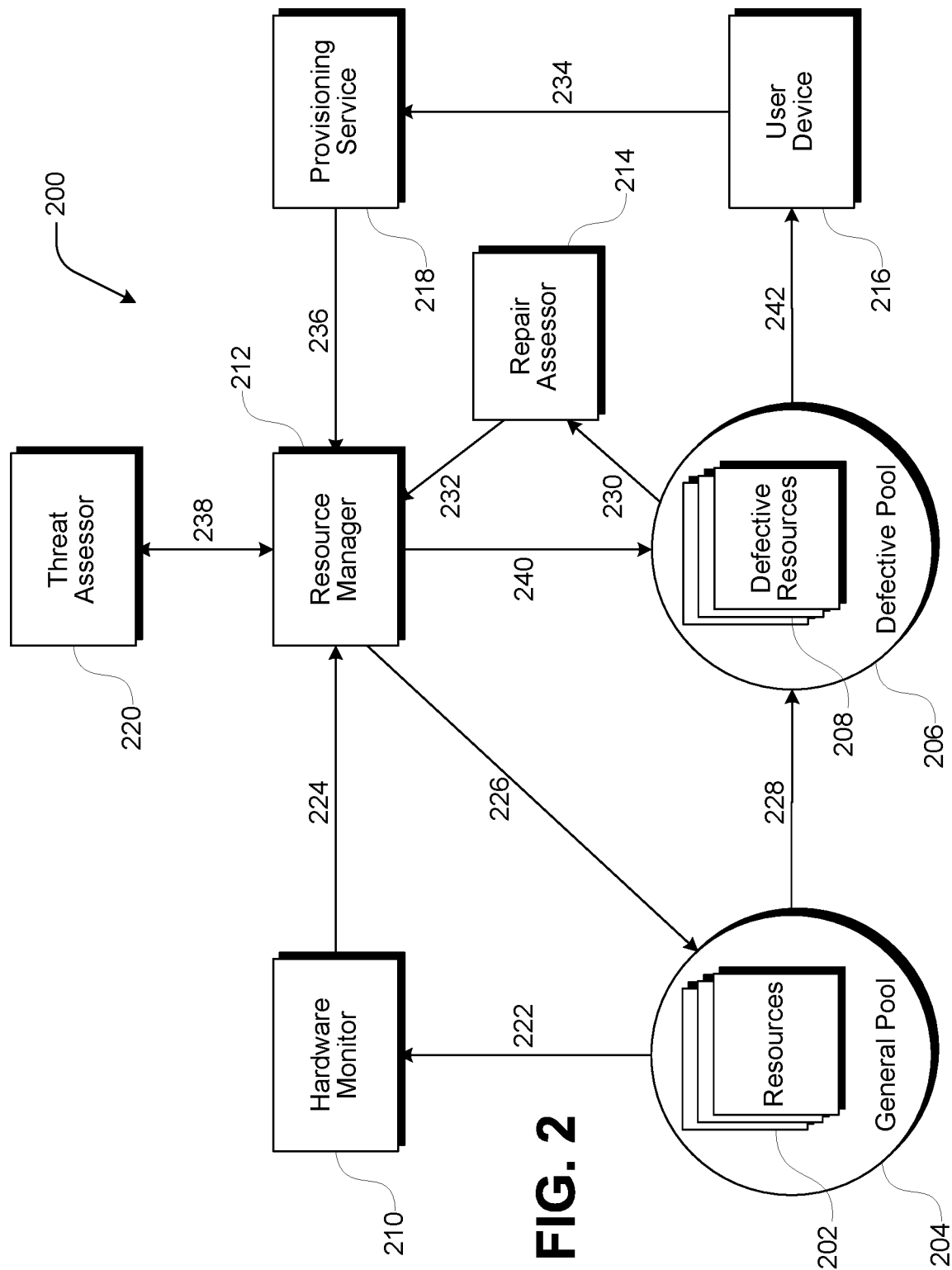
FIG. 2 is a block diagram illustrating an operating environment and example steps of a method of allocating defective computing resources to a defective resource pool for use in honeypot services.

FIG. 2 is a block diagram illustrating an operating environment 200 and example steps of a method of allocating computing resources 202 from a general pool 204 to a defective resource pool 206 that includes a set of defective computing resources 208 that can be used for providing honeypot services. In various examples, the resources 202 can comprise the non-defective resources 112A of FIG. 1 and the general pool 204 can comprise the general resource pool 108 of FIG. 1, or the like. The defective resources 208 can comprise the defective resources 112D of FIG. 1 and the defective resource pool 206 can comprise the defective resource pool 106 of FIG. 1, or the like.

The system 200 of FIG. 2 can also include a hardware monitor 210, a resource manager 212, a repair assessor 214, a user device 216, a provisioning service 218, and a threat assessor 220. In some examples, the user device 216 can comprise or be associated with the legitimate user 102 and/or malicious user 104 of FIG. 1, or can comprise any suitable device including a laptop computer, desktop computer, smart phone, tablet computer, gaming device, heads-up display, wearable computer, home automation computer, or the like.

One or more of the hardware monitor 210, resource manager 212, repair assessor 214, provisioning service 218, and threat assessor 220, can be embodied in any suitable hardware and/or software. In one example, the hardware monitor 210, resource manager 212, repair assessor 214, provisioning service 218, and threat assessor 220, can be a part of the web services system 106 of FIG. 1. In further examples, the hardware monitor 210, resource manager 212, repair assessor 214, provisioning service 218, and threat assessor 220, need not be associated and may or may not be physically proximate or running on hardware that is physically proximate.

As illustrated in FIG. 2, the hardware monitor 210 can receive 222 a notification from the general pool 204 and/or resources 202 of the general pool 204 that indicates that one or more resources 202 and/or portion of a resource 202 has an issue that has caused degradation of the resource 202 or portion of the resource 202. In some examples, such a notification can include an indication of a specific issue or piece of hardware that has failed or assumed a degraded state. In other examples, such a notification can include a general indication that a resource 202 or portion of the resource 202 has failed or assumed a degraded state.

The received 222 issue from the general pool 204 and/or resources 202 of the general pool 204 can be reported 224 to the resource manager 212, which calls 226 the general pool 204 and/or specified resource(s) 202 at issue and transfers 228 the one or more identified resources 202 at issue to the defective pool 206 of defective resources. As discussed above, in various examples, such a transfer 228 can comprise a logical transfer where an identifier, flag, metadata, tag, or the like, is changed to indicate that a given resource is part of the defective pool 206 instead of being part of the general pool 204.

In some examples, there can be any suitable number of computing resource pools and such pools may or may not be overlapping. For example, a defective resource pool can be split into a light-degradation pool and a heavy-degradation pool. In other words, in some examples, there can be any suitable number of computing resource pools that include resources of varying levels of degradation, varying types of degradation, and the like. For example, resources can be tagged to identify one or more defects present in the resource or a level of defectiveness, which may be used to select which resources are used to satisfy a user request and/or used to select one or more resource pools that a given resource should be associated with. Additionally, there can also be a pool of resources that are deemed inoperable or degraded to a level where they are effectively inoperable. In further examples, old or outdated computing resources can be allocated to a separate pool, including a defective resources pool (even if such resources are not strictly defective, but only old or outdated).

Returning to FIG. 2, the one or more defective resources at issue 208 and/or the defective pool 206 can report to a repair assessor 214, which generates a repair schedule or action item, which is reported 232 to the resource manager 212. For example, the repair assessor 214 can comprise a computer system that executes an automated process, perhaps in conjunction with input of a human operator received into one or more input devices, that assesses issues with the one or more defective resources 208 at issue and generates a plan for fixing the defective resource(s) 208 or otherwise diagnosing a problem with the defective resource(s) 208. Such a repair and/or diagnosis plan can include an estimated time until a technician can work on the resource(s) 208, an estimated time until replacement parts for the defective resource(s) 208 become available, and the like.

Sometimes separate and/or in parallel to the steps discussed above, the user device 216 sends 324 a request to the provisioning service 218. In various examples, the provisioning service 218 can authenticate the request, authorize the request, and otherwise determine whether the request from the user device 216 appears to be legitimate. For example, a determination can be made whether the request is associated with a correct password, is a request related to a correct type of computer instance, and the like.

Where the provisioning service 218 determines that the request sent 324 from the user device 216 initially meets basic criteria for being classified as a legitimate request (e.g., has valid use credentials), the provisioning service 218 passes 236 the request to the resource manager 212, which can score the threat level of the request by querying 238 the threat assessor 220. For example, a threat level can be determined based on criteria such as whether the user has ever spun up a virtual computing instance in the requested region before, whether there is an indication that the user account is compromised, instantiation of virtual machines in a manner that is uncharacteristic of behavior associated with the user account, an indication that the user will likely default on payment, previous history of abuse by the user, or the like.

Where a threat level score of the request is above a defined threat level threshold, the user request can be marked as malicious. A threat level threshold can be based on various suitable factors and can change based on various suitable factors. The threat level threshold can be set based on capacity of the general resource pool 204, number of malicious transactions being detected, and the like. For example, where resources 202 of the general resource pool 204 are extremely limited the threat level threshold can be reduced so that more malicious requests are detected to reduce the stress on the general resource pool 204. In another example, where a large number of malicious transactions are being detected, it may indicate that an attack or surge of malicious user is occurring and the threat level threshold can be reduced so that more malicious requests are detected.

With the request being marked as malicious by the threat assessor 220 or other suitable element, the resource manager 212 can determine whether there are defective resources 208 available in the defective pool 206 that are eligible to service the malicious user request. For example, a determination can be made whether there are defective resources 208 available in the defective pool 206 that have the capability of meeting the specifications of the request up to a desired quality threshold. In other words, a determination can be made as to whether defective resources 208 are available in the defective pool 206 that will satisfy the user's request without any diminished service indicating that the request is being serviced by defective resources 208.

This determination can also be based on a repair assessment made by the repair assessor 214 and can include a determination of whether the defective resources 208 in their degraded state would be suitable to handle the request and whether the time of repair associated with such defective resources 208 would allow such defective resources 208 to be allocated to service the malicious request without interrupting fixing or diagnosing such defective resources 208. Accordingly, defective resources 208 can be put to use servicing malicious users where such defective resources 208 would otherwise remain unused because such defective resources 208 are deemed unfit for allocation to legitimate users.

For example, if a given defective resource 208 is scheduled for repair in one week and would be capable of servicing the malicious user request, a determination can be made to allocate such a defective resource 208 if such an allocation would not likely impact the scheduled repair time. In other words, if the malicious user was likely to use the defective resource 208 for less than a week, then the defective resource 208 could be used to service the malicious request and still be available for scheduled repair.

The where defective resources 208 are available in the defective pool 206, the resource manager can call 240 the desired resources 208, which can be allocated 242 to the user 216 to fulfill the malicious user request. In various examples, servicing the user request can include full servicing of the request (aside from allocation of defective resources 208), or can include provisioning of honeypot computing services as described in more detail below. For example, in some situations, various computing services can be simulated, but may not be. Additionally, as discussed in more detail in this disclosure, the permissions, capabilities, or the like, of the user can be limited where the user's request has been classified as malicious. Additionally, in various examples, provisioning defective resources 208 to satisfy a request mean marking the resource 208 as unavailable for use while it is provisioned as a honeypot resource. For example, such resources may then be ineligible for repair, diagnosis or provisioning to satisfy other requests.

By providing malicious users with functioning but defective resources 208, it can be possible to observe and learn from the actions of the malicious users so as to train a threat assessment heuristic, gain evidence that can be used by law enforcement, and otherwise learn the behaviors of malicious users. In other words, the malicious uses may be unable to determine, or immediately determine, that they have been provided with defective resources 208 which may lead the malicious users to believe that they have not been detected. Such malicious users may then believe they are continuing to perpetrate their malicious acts under the assumption that they are undetected, which can allow for learning and prevention of real harm to others.

Additionally, as the user 216 makes further requests, or other information becomes available, the threat score associated with the user or one or more user requests can be modified. For example, where a request has initially be marked as malicious, but further requests from the user clearly indicate that the user is not malicious, the defective resources 208 can be replaced with non-defective resources 202 of the general pool 204.

Figure 3:
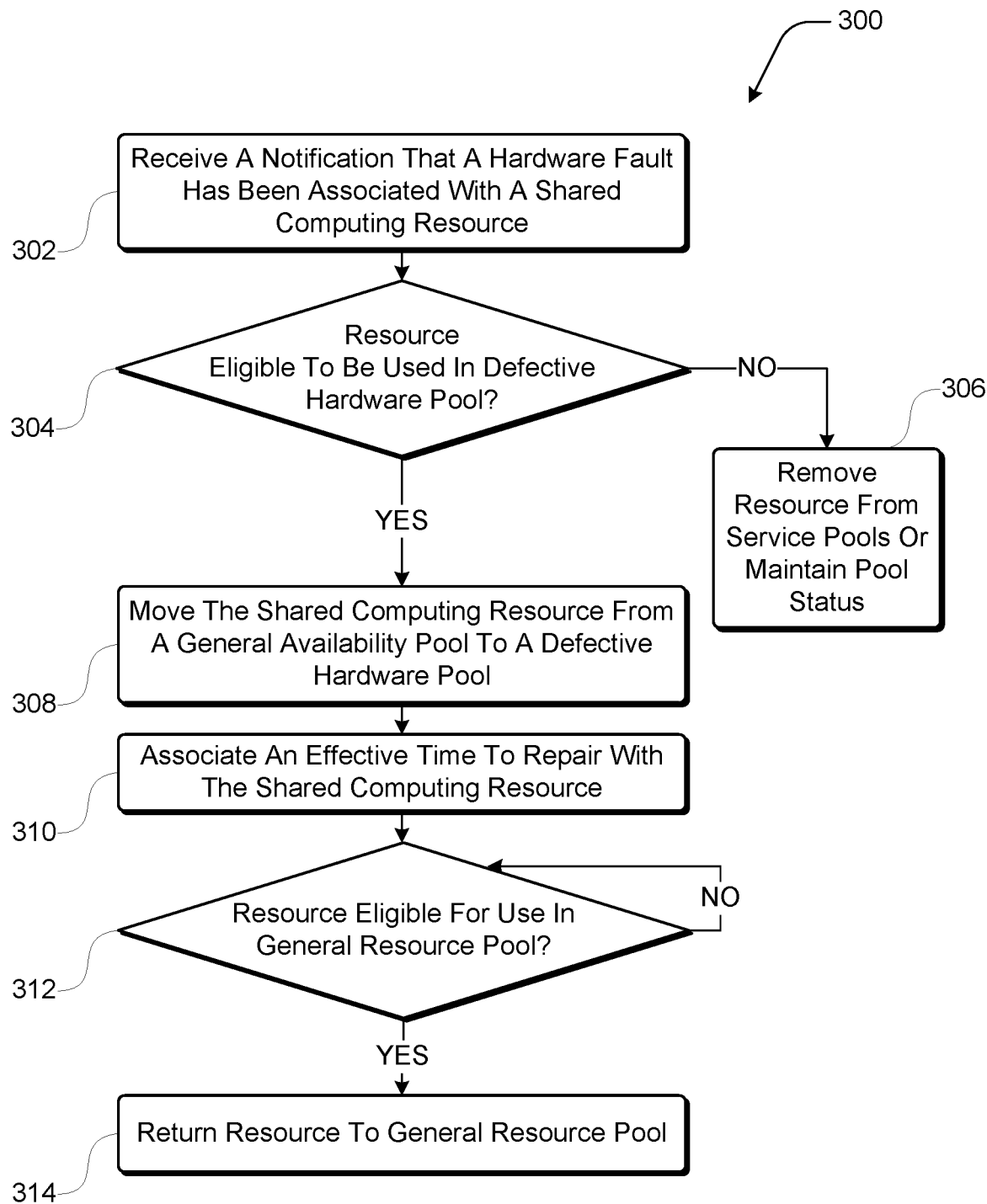
FIG. 3 is a block diagram illustrating an example method of allocating, by a resource manager, defective computing resources to a defective resource pool and repairing the defective computing resources.

FIG. 3 is a block diagram illustrating an example method 300 of allocating defective computing resources to a defective resource pool and repairing the defective computing resources. In various examples, the method 300 can be performed by, or in part by, the resource manager 212 of FIG. 2, or any other suitable hardware and/or software element.

The method 300 begins where a notification is received 302 that a hardware fault has been associated with a shared computing resource. For example, such a shared computing resource can be the resources 202, 112 of FIGS. 1 and/or 2, or any other suitable resources. At 304, a determination is made whether the computing resource is eligible to be used in the defective hardware pool. For example, where the hardware fault caused the resource to be completely inoperable or so degraded that it is effectively inoperable, then such a resource may not be eligible for inclusion in the defective hardware pool. Alternatively, where the hardware fault does not indicate a substantial degradation of the resource that would impact the resource's use in service, then the resource may not be eligible for the defective hardware pool because it can still be effectively used in a general hardware pool of non-defective resources.

Where the resource is eligible to be used in the defective hardware pool, the shared computing resource is reassociated 308 from a general availability pool to a defective hardware pool and an effective time to repair is associated 310 with the shared computing resource. However, if the resource is not eligible for use in the defective hardware pool, at 306, the resource is removed from service pools or maintained in the general availability pool. For example, as discussed above, if the resource is completely or effectively inoperable, it can be removed from service. Alternatively, where the hardware fault is non-substantial, the resource can remain in the general availability pool.

For resources that have been assigned to the defective resource pool, a determination is made, at 312, whether the resource is eligible for use in the general resource pool. For example, such determination can include whether repairs have been made to the resource, whether a diagnosis has been made of the resource, and whether such a diagnosis and/or repair indicates that the resource is in a state where it is suitable for use in the general hardware pool. Where resources are eligible, such resources are returned 314 to the general resource pool.

Figure 4:
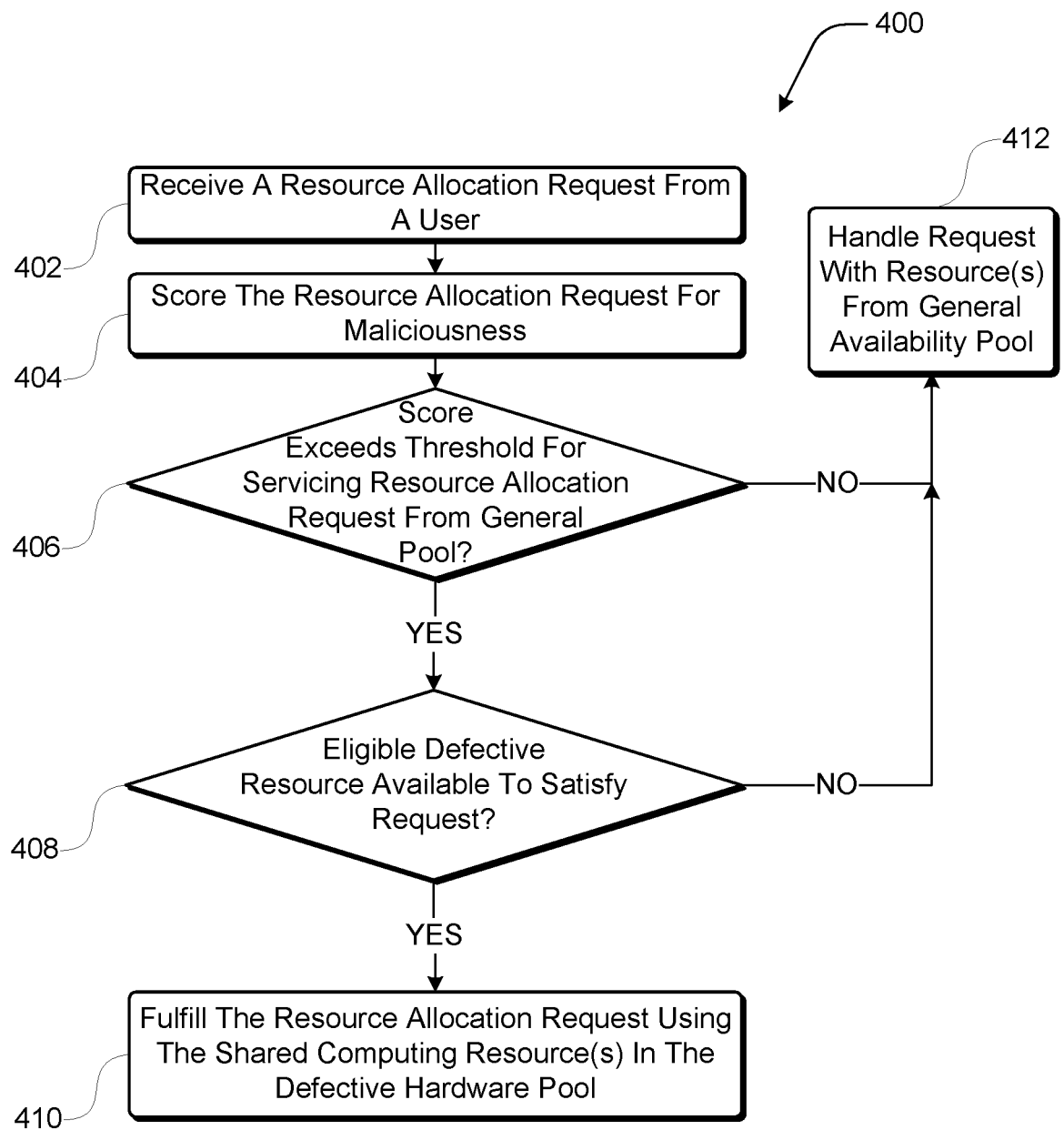
FIG. 4 is a block diagram illustrating an example method of servicing, by a provisioning service, a malicious user request using shared computing resources that are assigned to a defective hardware pool.

FIG. 4 is a block diagram illustrating an example method 400 of servicing a malicious user request using shared computing resources that are assigned to a defective hardware pool. In various examples, the method can be performed by the provisioning service 218 of FIG. 2, or any other suitable hardware and/or software element.

The method 400 begins where a resource allocation request is received 402 from a user by a provisioning service and the resource allocation request is scored for maliciousness. At 406, a determination is made whether the maliciousness score exceeds a threshold for servicing the resource allocation request from a general resource pool. In various examples, such a general resource pool can include one of the general pools 108, 204 of FIGS. 1 and 2, or the like. If the maliciousness score does not exceed the threshold, then the request is handled 412 with one or more resources from the general availability pool.

However, if the maliciousness score does exceed the threshold for servicing from the general resource pool, then at 408, a determination is made whether there are available resources in the defective resource pool to satisfy the request. For example, such a determination 408 can include determining whether one or more resources of the defective resource pool meet or substantially meet the requirement of the user request and/or whether use of such resources would allow the resources to be unused at a time when the resources are scheduled to be repaired or diagnosed for issues that have put the resource in a degraded state.

For example, an effective time to repair can be calculated for the defective resources and an estimated time of allocation can be calculated for the request, and if the estimated time of allocation is less than the effective time to repair or within a range of the effective time to repair, then a given resource can be eligible for allocation for the request. An estimated time of allocation can be based on historical data, including historical data for the user making request. For example, average historical time of resource allocation for a user can be used to calculate an estimated time of allocation for a new request.

If no resources are available to satisfy the request, then the request is handled 412 with one or more resources from the general availability pool. Alternatively, where no resources are available to satisfy the request, then the request can be declined and the user may not be provided with the requested computing resources or information. However, if resources are available to satisfy the request, then the request is fulfilled 410 using one or more shared computing resources in the defective hardware pool.

Figure 5:
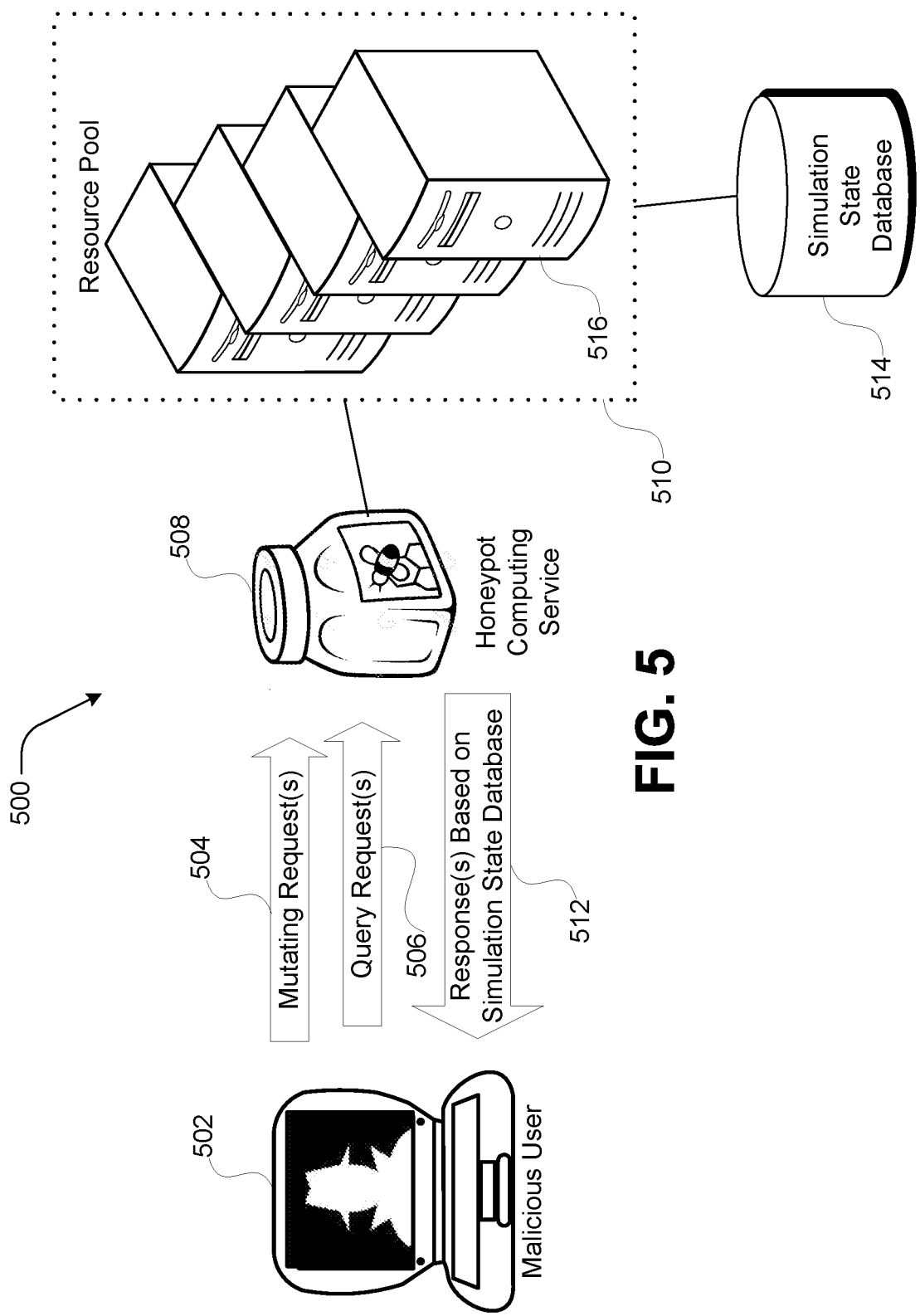
FIG. 5 illustrates an example operating environment where a malicious user provides requests to a honeypot computing service instantiated by a defective resource pool and where responses are provided to the malicious user based on a simulation state database.

FIG. 5 illustrates an example operating environment 500 where a malicious user 502 provides requests 504, 506 to a honeypot computing service 508 instantiated by a resource pool 510 and where responses 512 are provided to the malicious user 502 based on a simulation state database 514.

In various examples, the malicious user 502, can include the malicious user 104 of FIG. 1, the user device 216 of FIG. 2 or can include a user operating any suitable user device including a laptop computer, desktop computer, smart phone, tablet computer, gaming device, heads-up display, wearable computer, home automation computer, or the like. The honeypot computing service 508 can include the honeypot computing services 116 of FIG. 1 or any other suitable hardware and/or software element. The computing resource pool 510 can include the defective resource pool 106 and/or general resource pool 108 of FIG. 1, the general pool 204 and/or defective pool 206 of FIG. 2, or the like. The simulation state database 514 can include any suitable hardware and/or software element such as a virtual or non-virtual memory, which may or may not be a part of systems such as the web services system 100 of FIG. 1.

In various examples, the simulation state database 514 can indicate and track the state of various simulated computing resources. For example, in the case of virtual computing, when a malicious user requests instantiation of a virtual machine, instead of instantiation a virtual machine using real assets, a virtual machine can be simulated in a simulation state database. Accordingly, instead of instantiating the virtual machine on a physical host, an entry can be made in the simulation state database that a (simulated) virtual machine has been instantiated, and the malicious user can receive a notification that of instantiation of the (simulated) virtual machine that appears to be a notification of actual instantiation of the virtual machine in a physical host as requested. If the malicious user then sends a request to pause the virtual machine, an entry can be made in the simulation state databases that indicates the (simulated) virtual machine as being paused, and the malicious user can receive a notification that make it appear as if his real virtual machine has been paused. If the user then sends a request for the status of his virtual machine, the simulation state database can be queries and the status of paused can be identified. This pauses status of the (simulated) virtual machine can be sent to the malicious user and made to appear as if the status is from a real virtual machine.

Returning to FIG. 5, the resource pool 510 can comprise a plurality of defective resources 516 that can be used to instantiate a honeypot computing service 508. In some examples, the honeypot computing service 508 can comprise a computing service that mimics or simulates some or all of a set of web services, which can include virtual computing services. For example, the honeypot computing service 508 can be configured to simulate some or all of aspects of virtual computing services including instantiating one or more virtual machines; running of one or more virtual machines, stopping one or more virtual machines; configuring one or more virtual machines; querying one or more virtual machines, and the like.

Additionally, the honeypot computing service 508 can allow a system administrator to observe, track and contain the actions of the malicious user 502 so that any harmful actions that the malicious user 502 commits or attempts to commit are contained, stopped, and/or recorded for purposes of intervention by law enforcement or other parties.

The malicious user 502 can interact with the honeypot service 508 via various requests (e.g., application program interface (API) calls, and the like). As illustrated in FIG. 5, the malicious user 502 can communicate with the honeypot computing service 508 via one or more mutating requests 504 and/or one or more query requests 506. In some examples, a mutating request 504 can include a request to modify various aspects of one or more virtual or non-virtual machines, including attachment of one or more virtual or physical drive, physical host hardware preferences, physical host location, security group settings, type of machine image, instance size, cryptography settings, launching a virtual machine, pausing a virtual machine, taking a snapshot of a virtual machine, stopping a virtual machine, launching a non-virtual machine, pausing a non-virtual machine, taking a snapshot of a non-virtual machine, and the like.

In some examples, a query request 506 can include a request for status of, or data related to, various aspects of one or more virtual or non-virtual machine, including attachment status of one or more virtual or physical drive, physical host hardware status, physical host location, security group settings, type of machine image, instance size, cryptography settings, state of a virtual machine (e.g., running, stopped, paused), memory space usage, and the like.

In various examples, the malicious user 502 can submit requests 504, 506 via a user interface, which can comprise a webpage presented on user device 502, or the like. Additionally, the malicious user 502 can receive responses 512 to submitted requests 504, 506, and such responses can be based on a simulation state database. For example, where the malicious user submits requests 504, 506 via a user interface, the malicious user can also receive responses to the requests 504, 506 via the user interface. In some examples, some or all of the responses can come from live computing resources and/or some or all of the responses can be based on simulated computing resources.

In various examples, where it is possible to simulate some or all portions of a honeypot computing service 508, the simulation state of the simulated honeypot computing service 508 can be stored in the simulation state database. In one example, a malicious user 502 can request to instantiate one hundred virtual machines, each having multiple processing cores, but instead actually providing the malicious user 502 access to such resources, a simulation of such resources can be created such that the malicious user 502 will believe that the requested services have been provisioned based on responses 512 in a user interface that are generated in response to mutating and/or query requests 504, 506. Accordingly, the malicious user 502 can be tracked and monitored without having the malicious user 502 tying up resources that could be put to better use elsewhere, such as tracking other malicious users 502 and/or servicing legitimate users.

In other words, while a malicious user can request the provisioning of computing resources having certain specifications, some or all off the requested computing resources can be simulated. For example, the malicious user can request a set of computing resources, and no computing resources are provisioned to the user, but instead a simulation state database is used to simulate all of the requested computing resources. In such an example, a mutating request may not configure any real computing resources and may only trigger updating of a simulation state database to simulate the requested resources.

In other words, fulfilling a mutating request made by a malicious user can include simulating a response to the mutating request based on the current state of the simulated resource in the simulation state database. For example if the request was to terminate a first virtual machine instance, the database may indicate one of several things: the first instance is active; first instance has been terminated; there is no first instance; and the like etc. The response provided to the malicious user for such a request (and the actual update made to the simulation state database) depends on what the current state of this simulated is as defined by the simulation state database. For instance, if the simulation state database indicates that first instance is active when the request is received, the response would be successful and the simulation state database would be updated to indicate that the first instance has been terminated. However, if the simulation state database lacked an entry for first instance when the request to terminate was received, the response may be a failure and no update to the simulation state database may be made.

In another example, the malicious user can request a set of computing resources, and non-conforming resources can be provisioned to the user (e.g., resources from a defective resource pool, or the like), but the malicious user can receive an indication that conforming resources have been provisioned. Some or all of the functionalities that such non-conforming computing resources are unable to perform can be simulated by a simulation state database, or the like.

In a further example, a user can request a set of computing resources, and a portion of the requested resources can be simulated and a portion of the resources can be provided by provisioning real computing resources (including resources from a defective resource pool and/or a general resource pool). In other words, part of a malicious user request can be fulfilled with real resources, and a part can be simulated, but the malicious user receives and indication that all requested resources have been provisioned and receives responses to queries and mutations of these resources that correspond to responses that would come from the requested set of resources.

Figure 6:
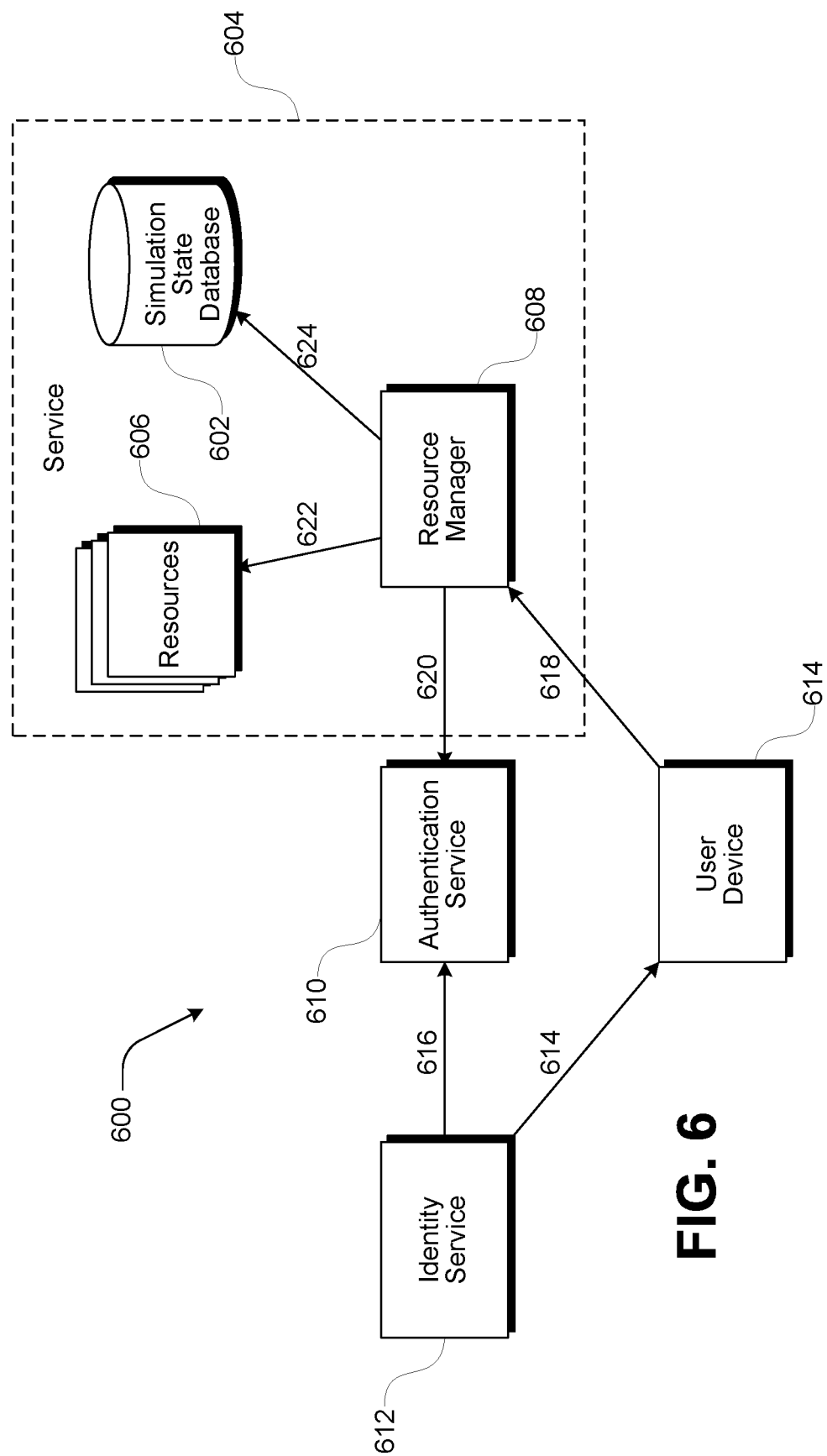
FIG. 6 is a block diagram illustrating an operating environment and example steps of a method of identifying a malicious user and generating a honeypot computing service using a simulation state database.

FIG. 6 is a block diagram illustrating an operating environment 600 and example steps of a method of identifying a malicious user and generating a honeypot computing service using a simulation state database 602. The operating environment 600 is shown including a service 604 that includes the simulation state database 602 and a plurality of resources 606 that are operably connected to a resource manager 608. The operating environment 600 also includes an authentication service 610, an identity service 612 and a user device 614.

In some examples one or more of the simulation state database 602, resources 606, resource manager 208, authentication service 610, and identity service 612 may or may not be part of a system such as the web services system 100 of FIG. 1.

Additionally, the resources 606 can include the computing resource pool 510, defective or general resource pools 106, 108 of FIG. 1, the defective pool 206 of FIG. 2, or the like. The user device 614 can comprise or be associated with the malicious user 104 of FIG. 1, the user device 216 of FIG. 2, malicious user of FIG. 5, or can include a user operating any suitable user device including a laptop computer, desktop computer, smart phone, tablet computer, gaming device, heads-up display, wearable computer, home automation computer, or the like. The simulation state database 602 can include the simulation state database 514 of FIG. 4 or can include any suitable hardware and/or software element such as a virtual or non-virtual memory. The resource manager 608 can include the resource manager 212 of FIG. 2 or can include any suitable hardware and/or software element.

As illustrated in FIG. 6, the identity service can provision 614 honeypot credentials to the user device 614 and can report 616 these honeypot credentials to the authentication service 610. In various examples, the honeypot credentials can be provisioned such that the user device 614 is unaware that the honeypot credentials are any different than normal credentials that a legitimate user would receive. In other words, a malicious user associated with the user device 614 would not be able to distinguish legitimate user credentials from honeypot user credentials. For example, the honeypot credentials may outwardly have the same type of identifiers as legitimate credentials and indicators such as "Honeypot" and the like may be absent from the credentials. Additionally, a user interface presented on the user device may not provide any indications that are different from a session using legitimate user credentials. Accordingly, malicious users may not be tipped off that they have been flagged, categorized or branded as a malicious user.

In other examples, a honeypot credentials may have a clear indication that they are different than legitimate credentials. For example, such credentials or keys can include strings such as "Honeypot," "Malicious User," "Hacker," or the like. Providing such credentials can be used to identify how sophisticated a malicious user is and/or whether the malicious user is actually a bot or other automated program that would not notice a clear indication of honeypot credentials that are different from legitimate user credentials. Alternatively, a honeypot indicator can include any suitable tag, string, identifier, code, serial number, or the like. In further examples, a honeypot indicator can be an implicit indicator, for instance, when a mathematical property of the credential indicates whether the credential is a honeypot credential or not, or where credentials are honeypot credentials if the sum of digits in the credential has a particular value mod N, or a checksum has a particular value, or the like.

The user device 614 can send a request to the resource manager 608 using the provisioned honeypot credentials, which can be authenticated 620 by the authentication service 610. The authentication service 610 can provide an indication to the resource manager 608 that the request is being made with honeypot credentials, which the resource manager 608 can use to provision real and/or simulated resources accordingly.

In one example, resources 606 can include general pool resources that are only used for legitimate users and the simulation state database 602 can be used for malicious users or users having honeypot credentials. In other words, the resource manager can selectively provision 622 resources 606 for legitimate users and can provision 624 simulated resources via the simulation state database 602 for malicious or honeypot users.

In further examples, a combination of simulated resources via the simulation database 602 and real resources 606 can be provisioned 622, 624 for malicious or honeypot users as necessary. For example, where it is determined that the honeypot user will not be sufficiently fooled by only simulated resources, then some or all of the resources provided to the honeypot user can be real resources 606, which can include defective and/or non-defective resources as discussed above.

Figure 7:
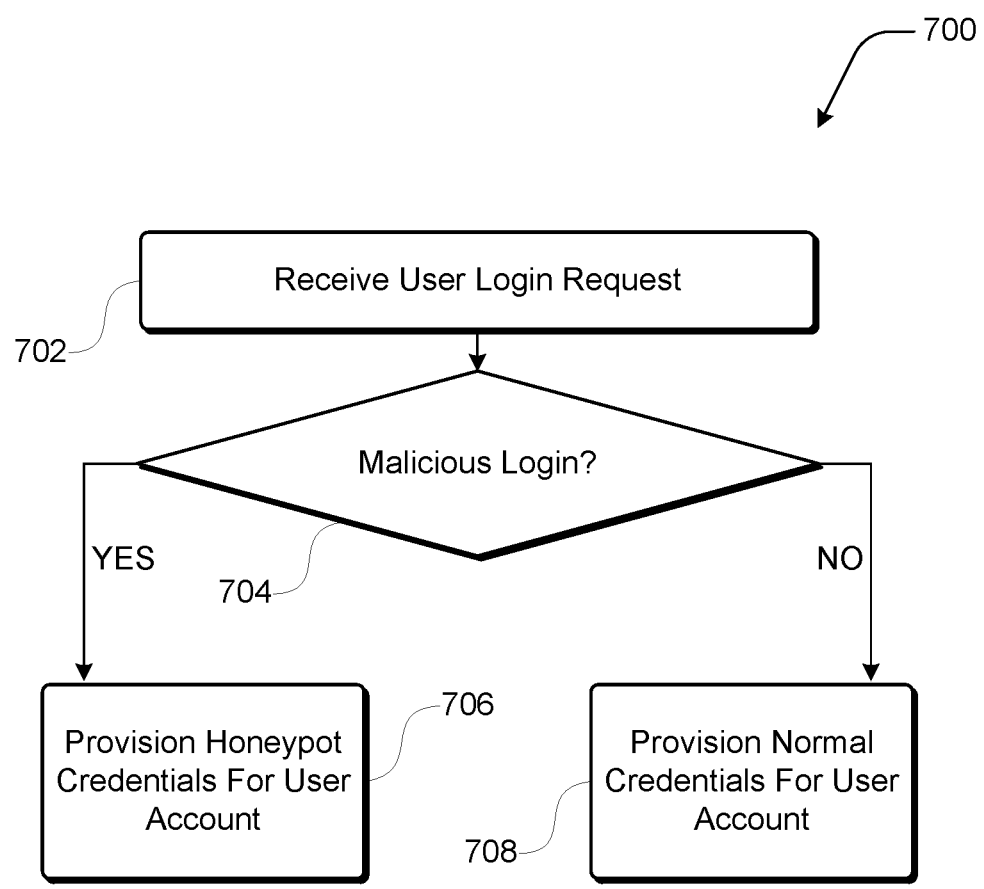
FIG. 7 is a block diagram illustrating an example method of, at an authentication service, determining whether a user is malicious and provisioning normal or honeypot credentials for the user's account.

FIG. 7 is a block diagram illustrating an example method 700 of determining whether a user is malicious and provisioning normal or honeypot credentials for the user's account. In some examples, the method 700 can be performed in whole or in part at an identity service 612 and/or authentication service 610 of FIG. 6. The method 700 begins where a user login request is received 702, and at 704, a determination is made whether the user is malicious.

If the user is determined to be malicious, the user can be provisioned 706 with honeypot credentials. However, if a user is determined to not be malicious, the user can be provisioned 708 with normal credentials. Honeypot and normal (non-honeypot) credentials can distinguishable to a system that authenticates using the credentials and, as a result, the system can determine how to process a request made using the credentials. As discussed, honeypot credentials can provide an indication that some or all of a set of requested set of computing resources be providing using resources from a defective pool and/or provided in the form of a simulation where such resources are not actually provided. In various examples, regular or non-honeypot credentials can provide an indication to a system to allocate real computing resources from a general resource allocation pool, which can be the best resources available.

In one example, as discussed in this disclosure, a user request can be scored for maliciousness and if the score is higher than a threshold, the user can be deemed malicious and provisioned 706 with honeypot credentials. In another example, a fraud score heuristic can be used to generate a fraud score and if the score is higher than a threshold, the user can be deemed malicious and provisioned 706 with honeypot credentials.

Although some examples include provisioning different credentials (e.g., keys, or the like) based on whether a user is identified as being malicious or not, in further examples, an existing user credential or account can be flagged as being malicious so that honeypot services can be provided to that malicious user (e.g., have metadata associated with the user account indicating the account to be malicious or fraudulent). In other words, the same credentials or key can be used by the user, but treatment of and response to these credentials can be changed based on determined maliciousness. Additionally, treatment of and response to a given credential, key or account can be different based on the user device that sent a request. For example, a first user device that uses a given user credential can be provisioned with honeypot services whereas a second user device that uses the same credential can be provisioned with legitimate services.

Figure 8:
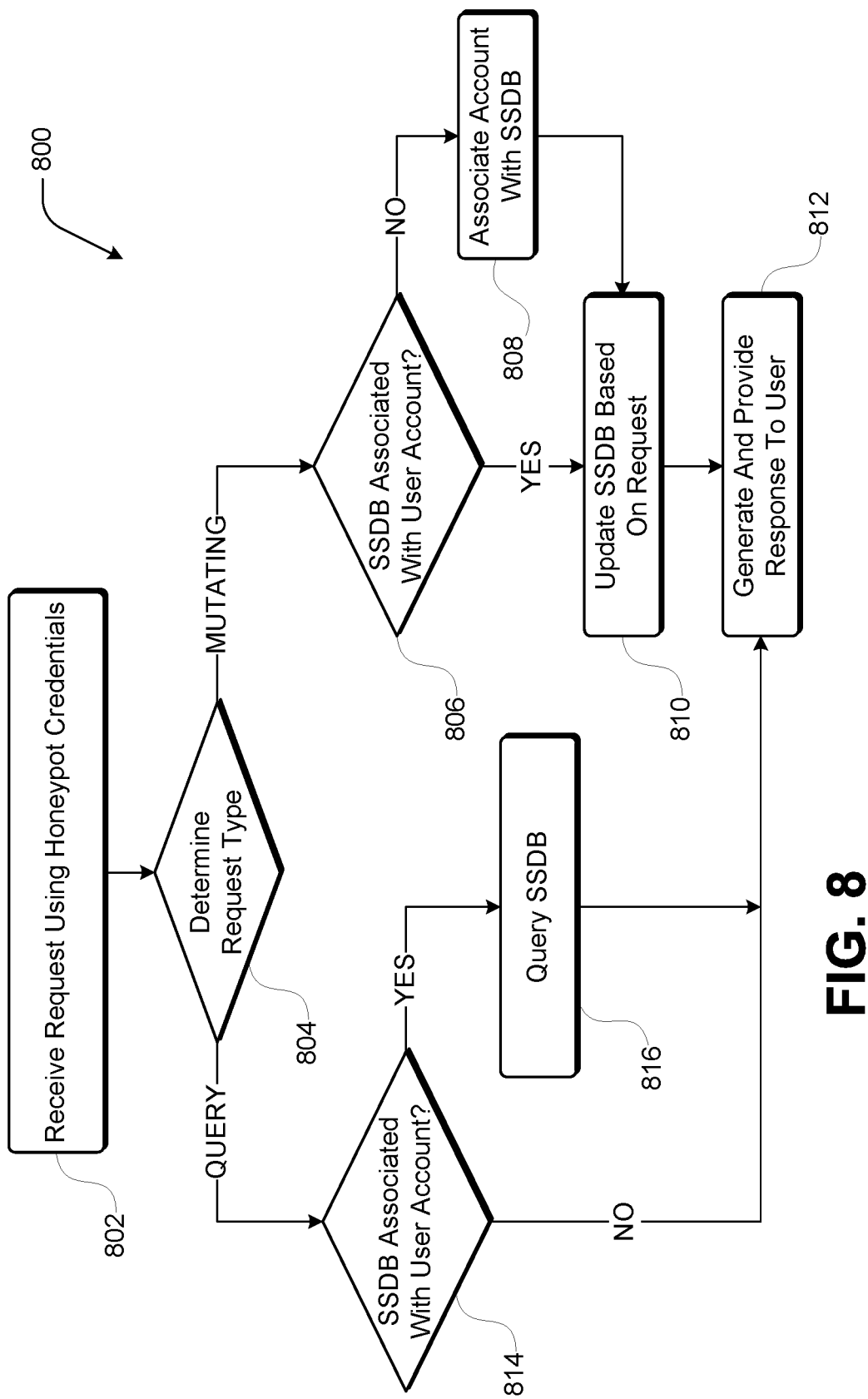
FIG. 8 is a block diagram illustrating an example method of a service provisioning and running a honeypot computing service based on the types of requests provided by a user having honeypot credentials.

FIG. 8 is a block diagram illustrating an example method 800 of a service (e.g., the service 604 of FIG. 6) provisioning and running a honeypot computing service based on the types of requests provided by a user having honeypot credentials. The method 800 begins where a request using honeypot credentials is received 802, and at 804, a determination is made regarding what type of request has been received.

If the request is a mutating request, at 806, a determination is made whether a simulation state database (SSDB) is associated with the user account. If not, a simulation state database is associated 808 with the user account, the simulation state database is updated 810 based on the request, and a response is generated and provided 812 to the user. However, if a simulation state database is associated with the user account, the simulation state database is updated 810 based on the request and a response is generated and provided 812 to the user.

For example, a malicious user can provide a mutating request to instantiate a virtual machine, but instead of actually instantiating the virtual machine and allowing the malicious user to tie up valuable resources that could otherwise be used by a legitimate user, the virtual machine can be simulated with a simulation state database as discussed in detail above. Where a simulation state database is not already associated with the malicious user's account, one can be associated, and the simulation state database can be updated to reflect instantiation of a (simulated) virtual machine that meets the specifications of the malicious user request. Responses to the request, such as a confirmation of instantiation of the virtual machine, can be provided to the malicious user via a webpage or other suitable user interface.

Returning to the method 800, if the request type is determined to be a query request, at 804, a determination is made, at 814, whether a simulation state database is associated with the user account. If not, then a response is generated and provided 812 to the user. However, if a simulation state database is associated with the user account, then the simulation state database is queried 816 and a response is generated and provided 812 to the user.

For example, where no simulation state database is associated with the user account, this can indicate that there are no simulated running virtual machines associated with the user account, and therefore there would be no state to present to the user. Accordingly an error message, or the like, can be provided in response to a query request if no simulation state database is associated with the user account. On the other hand, where a simulation state database is associated with the user account and the malicious user provides a query request, the simulation state database can be queried to identify the simulated state of the resources and a response indicating the state of the simulated resources can be provided to the user.

In further examples, where honeypot computing services are provided to the malicious user that includes both real and simulated resources, then in addition to querying and/or updating a simulation state database, actual resources can be queries and/or mutated as necessary. Additionally, providing real and/or simulated resources to the malicious user can change over time. For example, where the malicious user makes requests that require inexpensive or simple assets, then a decision can be made to provide real resources instead of simulated resources. However, if the malicious user makes requests that then require expensive, complex or limited resources, then a decision can be made to simulate such resources instead of actually providing them to the malicious user. Additionally, determining whether to use simulated and/or real resources can be based on a determined fraud score, maliciousness score, or the like.

In some examples, the simulation state database can provide simulated computing resources to assist real computing resources that cannot perform certain actions due to being in a degraded state. For example the simulation state database can track a state for activities that a resource cannot do because the resource is defective. Accordingly, some mutating requests can affect only the simulation state database whereas other mutating requests can affect both the simulation state database and the defective resource.

Figure 9:
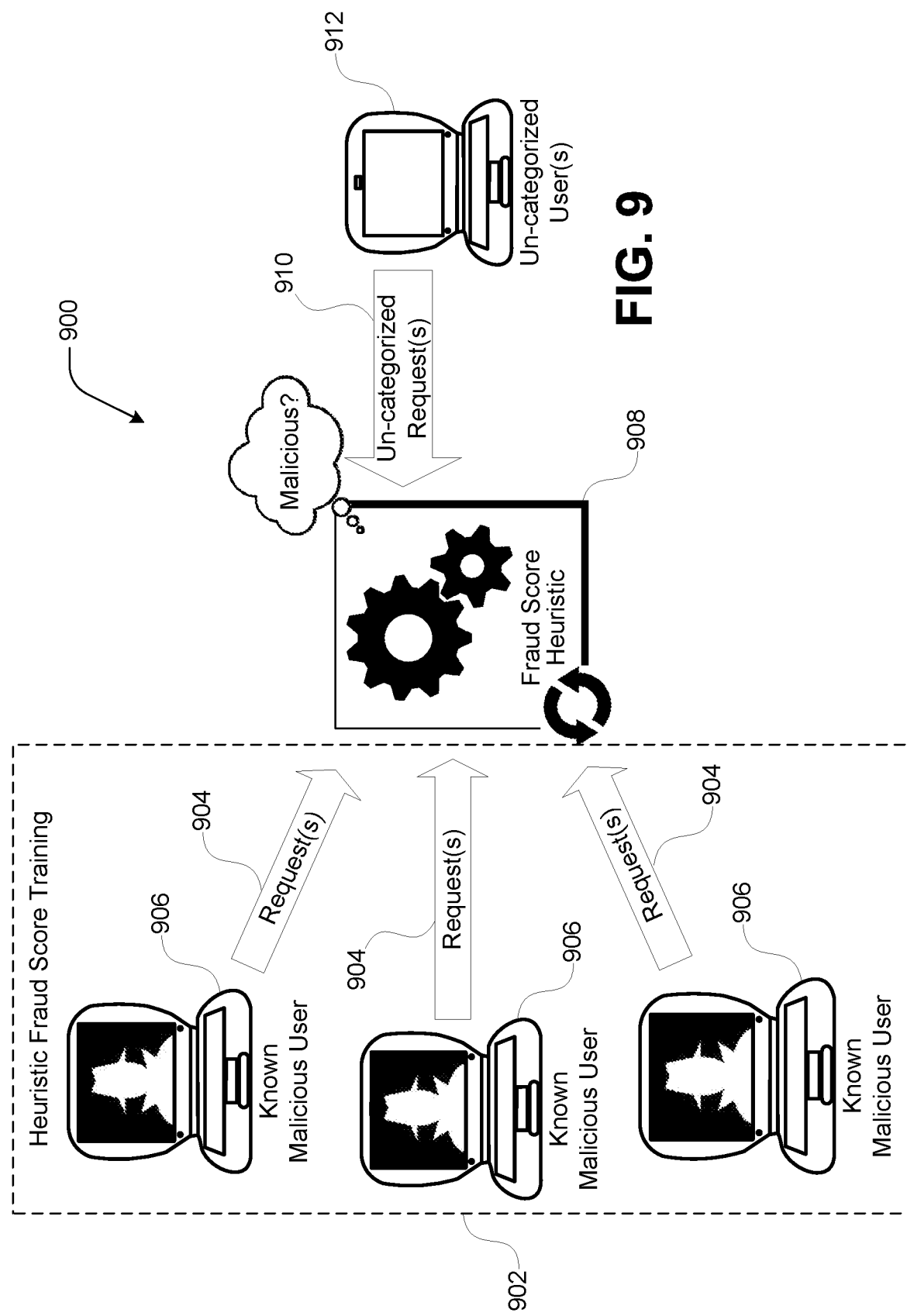
FIG. 9 illustrates an example operating environment where a fraud score heuristic is trained by requests provided by malicious users and the fraud score heuristic being used to determine whether uncategorized requests from other users are malicious.

FIG. 9 illustrates an example operating environment 900 where a fraud score heuristic is trained 902 by requests 904 provided by malicious users 906 and the fraud score heuristic 908 being used to determine whether uncategorized requests 910 from other users 912 are malicious. In various examples, the malicious users 906 and/or uncategorized user(s) 912 can include any suitable user device including a laptop computer, desktop computer, smart phone, tablet computer, gaming device, heads-up display, wearable computer, home automation computer, or the like. Additionally, the malicious user 906 can include and/or be associated with the malicious user 104 of FIG. 1, the user device 216 of FIG. 2, malicious user 502 of FIG. 5, and/or the user device 614 of FIG. 6. Also, the uncategorized user(s) 912 can include and/or be associated with the malicious or legitimate user 102, 104 of FIG. 1, the user device 216 of FIG. 2, malicious user 502 of FIG. 5, and/or the user device 614 of FIG. 6.

The fraud score heuristic 908 can include any suitable simple or complex algorithm implemented on a hardware and/or software element. For example, the fraud score heuristic 908 can comprise, user and/or be modified based on one or more value, a k-means clustering algorithm, a neural net, a support vector machine, a Bayesian network, a genetic algorithm, a regression algorithm, an instance-based algorithm, a clustering algorithm, a decision tree algorithm, or the like. In some examples, the fraud score heuristic can comprise and/or use supervised, unsupervised or semi-supervised machine learning.

As illustrated in the example of FIG. 9, heuristic fraud score training 902 can include a set of training data that includes a set of requests 904 coming from one or more known malicious users 906. These known malicious requests 904 can be used to train the fraud score heuristic 908. In other words, by analyzing a set of known malicious requests 904, patterns, characteristics and/or identifiers of malicious requests can be identified so that un-categorized requests 910 can be analyzed to determine whether these requests are malicious or legitimate. In further examples, requests can be re-categorized or have a category confirmed. For example, a request or set of requests can initially be categorized as non-malicious, but the fraud score heuristic 908 can re-categorize the request or set of requests as being malicious or confirm the categorization of non-malicious. A set of malicious requests 904 may be known as or defined as being malicious in various suitable ways. For example, where a user account has been provisioned with malicious user credentials as discussed, requests made from this user account can be defined as known malicious requests.

In further examples, a set of training data for a fraud score heuristic 908 can include requests from both malicious users 906 and legitimate users. In such an example, the fraud score heuristic 908 can be trained to identify patterns, characteristics and/or identifiers of legitimate and malicious requests so that un-categorized requests 910 can be classified as being either legitimate or malicious. In still further examples, any suitable training data, from or associated with one or both of malicious and legitimate users, can be used to train a fraud score heuristic 908. For example, such data can include user profile data, user request history, user internet protocol (IP) address, user location, user device configuration, and the like.

Additionally, in some examples, more than one fraud score heuristic 908 can be created and trained. In one example, a fraud score heuristic 908 can be trained for individual users or groups of users that are known to be legitimate, and the fraud score heuristic 908 can be used to determine whether future requests from the user or group of users indicates that the user has become malicious or that the user account has been compromised and taken over by a malicious user. A fraud score heuristic 908 can be trained for groups of users based on one or more user characteristic, including user type (e.g., individual, enterprise, small company, or the like), user location, user payment type, user credit history, or user computing service type (e.g., website hosting, data storage, data processing, supercomputing, machine learning, business intelligence, application development, application testing, internet of things, and the like).

Figure 10:
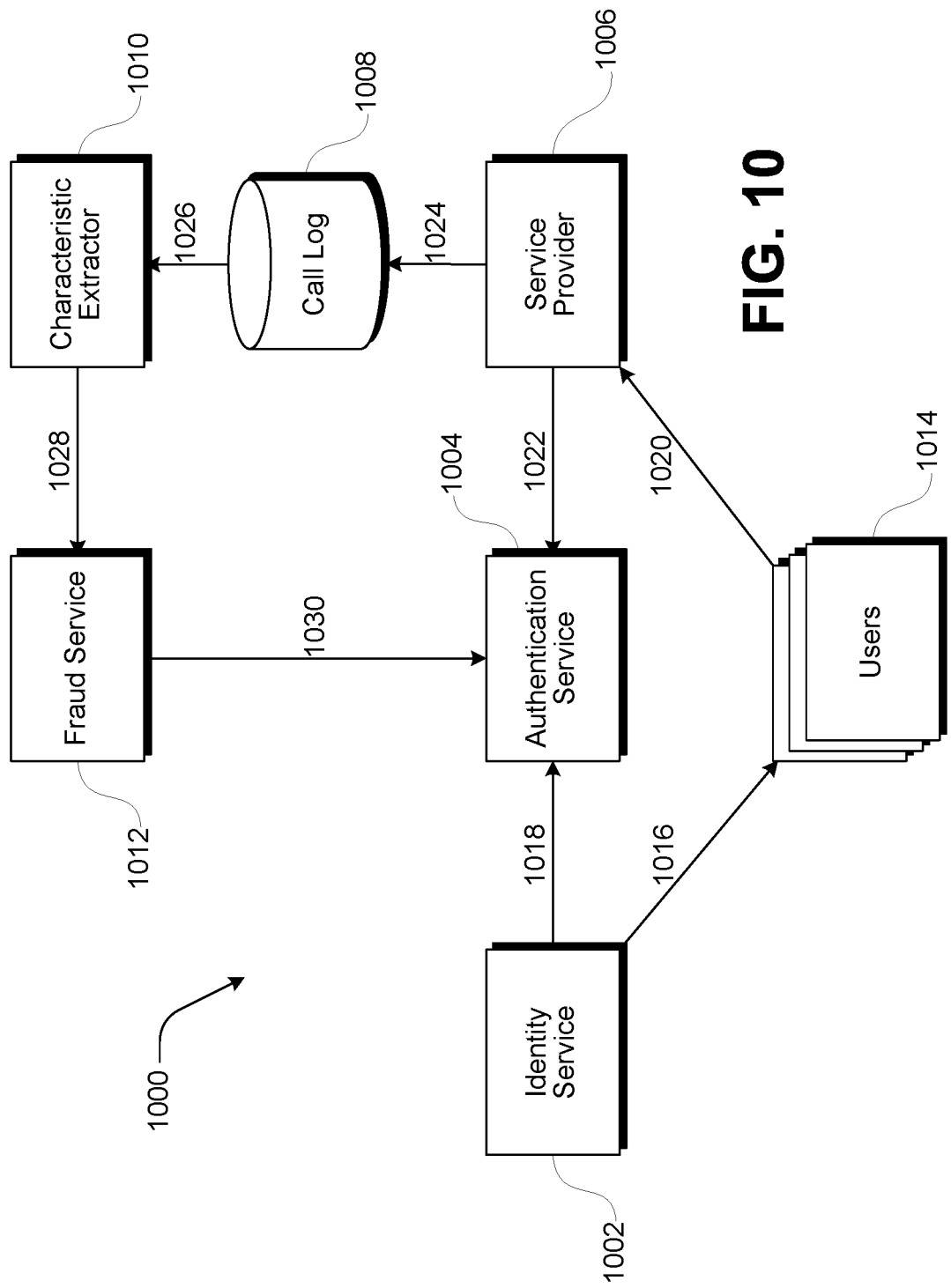
FIG. 10 is a block diagram illustrating an operating environment and example steps of a method of training a fraud score heuristic and using the fraud score heuristic to determine whether a request is malicious.

FIG. 10 is a block diagram illustrating an operating environment 1000 and example steps of a method of training a fraud score heuristic and using the fraud score heuristic to determine whether a request is malicious. The operating environment 1000 includes an identity service 1002, an authentication service 1004, a service provider 1006, a call log 1008, a characteristic extractor 1010, a fraud service 1012 and one or more users 1014.

In various examples, the users 1014 can include and/or be associated with the malicious or legitimate user 102, 104 of FIG. 1, the user device 216 of FIG. 2, malicious user 502 of FIG. 5, the user device 614 of FIG. 6, and/or the uncategorized user(s) 912 of FIG. 9. The user 1014 can also include any suitable user device including a laptop computer, desktop computer, smart phone, tablet computer, gaming device, heads-up display, wearable computer, home automation computer, or the like. In various examples, the identity service 1002, authentication service 1004, service provider 1006, call log 1008, characteristic extractor 1010, and/or fraud service 1012 can be any suitable hardware and/or software element and may or may not be part of a system such as the web services system 100 of FIG. 1.

As illustrated in FIG. 10, the identity service 1002 can provision 1016 honeypot credentials to one or more users 1014, which can be reported 1018 to the authentication service 1004. As discussed, honeypot credentials can be different than legitimate user credentials or can be indistinguishable from legitimate user credentials, with the user account being flagged for honeypot services at the authentication service 1004, or the like. The one or more users 1014 can use the provisioned honeypot credentials to request 1020 services at the service provider 1006, which authenticates 1022 the credentials at the authentication service 1004 and indicates to the service provider 1006 that the credential is a honeypot credential and/or that the user account has been flagged for honeypot services.

The service provider 1006 can record 1024 the request in the call log 1008, which can include an indication of a geographical location of a user device that generated the request, that the request was associated with honeypot credentials, that the request was associated with a honeypot account, parameters of the request, an operation associated with the request, a query associated with the request, IP address, and the like. In some examples, the call log 1008 can be a honeypot-specific call log that is separate from a general call logging service that tracks calls from all users and/or legitimate users. The call log 1008 can be specific to a single user account or can track multiple user accounts.

The characteristic extractor 1010 can be running 1026 off the call log 1008 and can examine requests that are stored in the call log 1008. Extracted characteristics of the requests can be provided 1028 to a fraud service 1012 which can be configured to generate a fraud score for the request and/or train a fraud score heuristic that evaluates whether one or more requests should be classified as fraudulent. In some examples, the fraud service 1012 can comprise or be associated with the fraud score heuristic 908 of FIG. 9, or the like.

The fraud service 1012 can provide 1030 fraud patterns, a fraud score service, or the like to authentication service 1004, which can use such information to evaluate requests or other activity associated with the users 1014 to determine whether such requests or activities should be classified as malicious or fraudulent behavior.

Figure 11:
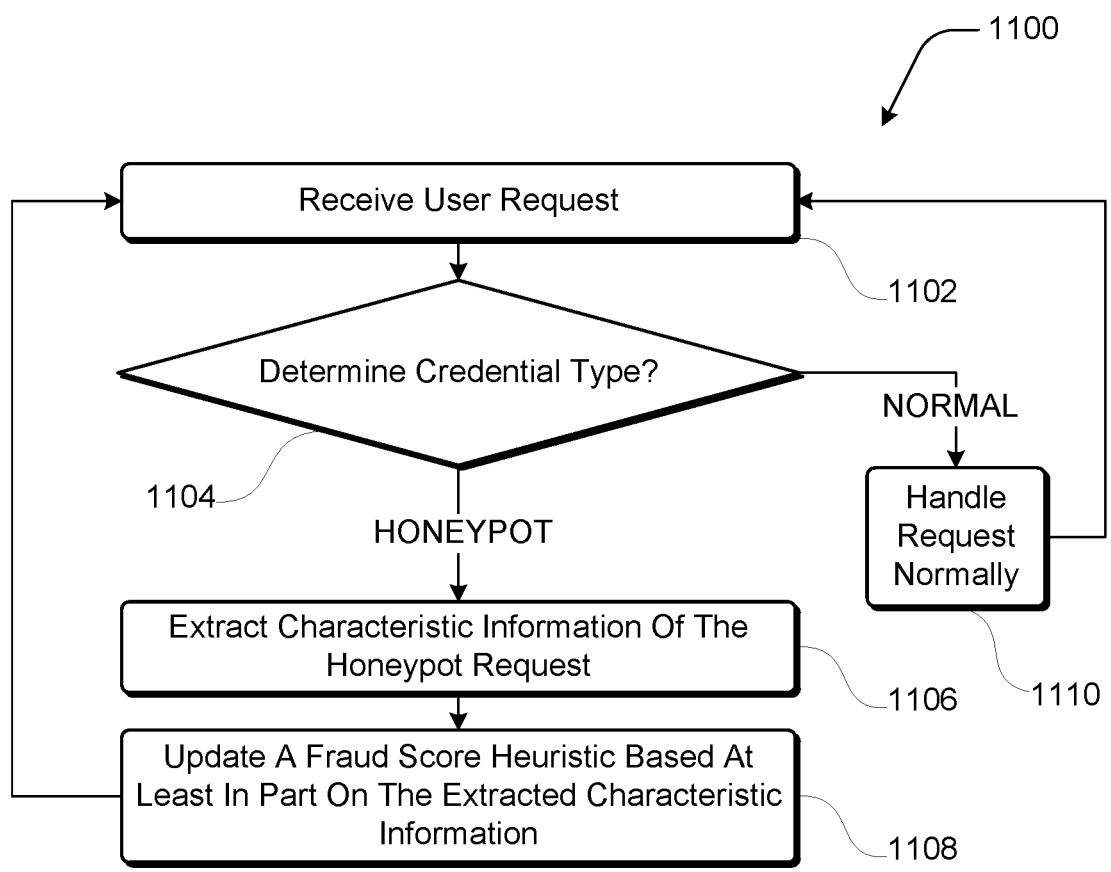
FIG. 11 is a block diagram illustrating an example method of a service training a fraud score heuristic and handling user requests based on whether the user has normal or honeypot credentials.

FIG. 11 is a block diagram illustrating an example method 1100 of a service training a fraud score heuristic and handling user requests based on whether the user has normal or honeypot credentials. For example, the web services system 100 of FIG. 1, or the like, can perform the method 1100. The method 1100 begins where a user request is received, and at 1104, a determination is made whether the user credentials are honeypot or normal credentials. In some examples, such a determination can be based on the credentials themselves. In other words, the credentials can include an indicator that the credentials are honeypot credentials or non-honeypot credentials. Alternatively, authentication of the credentials can include referencing a database that includes an identifier of whether the credentials are flagged as being honeypot credentials or normal credentials.

If the credentials are determined to be normal credentials, then the request is handled 1110 normally. For example, normal handling 1110 can include provisioning, modifying or querying requested computing services without any observation, limitation or simulation that may be associated with honeypot services as discussed. Additionally, normal handling 1110 can include provisioning computing resources from a general pool of resources instead of a defective pool of resources as discussed in this disclosure.

On the other hand, if the credentials are determined to be honeypot credentials, then characteristic information of the request are extracted 1106. For example, such extraction can be performed by the characteristic extractor 1010 of FIG. 10. Extraction of characteristics of a request can include extraction of any suitable data, information, characteristics, or the like that is a part of or associated with the request, a user account associated with the request and/or computing resources associated with the request. For example, an extracted characteristic can include, user location, user IP address, time from last request, physical host location, user agent, request clock skew, user language, user device type, user device operating system, machine type being requested, number of machines being requested, operating system of machine being requested, type or content of any previous or subsequent request, or the like.

With the characteristic information extracted 1106, a fraud score heuristic is updated 1108 based on the extracted characteristic and the method cycles back to 1102 where further requests are received 1102. Accordingly, a fraud score heuristic can be iteratively updated based at least on honeypot requests received over a period of time.

FIG. 12 illustrates a request set 1202 being used to identify clusters 1204 that can be used as predictors of malicious user requests. The request set 1202 can comprise one or more requests that include one or more parameters. Request parameters can include extracted characteristics of one or more request a discussed. In this example, each request includes parameters A-L, but any suitable number of parameters can be present in further examples. The parameters A-L of the request set 1202 can be plotted in any suitable number of dimensions to identify clusters 1204 that are indicative of a pattern among the parameters of the request set 1202.

The example plot 1200 shown in FIG. 12 is shown in two dimensions for simplicity, but in further examples, plotting in more than two dimensions can be applied. For example the request set 1202 illustrates requests having twelve parameters A-L. Accordingly in such an example, plotting in twelve dimensions corresponding to each of the parameters can be desirable.

As shown in the simplified graph 1200 of FIG. 12 a centroid 1206 for each of the clusters 1204 can be identified, and the centroids 1206 can be used to define a pattern that is characteristic of malicious or fraudulent requests. For example, where an uncategorized request is plotted in the same space, proximity to the one or more centroid 1206 (e.g., according to a Euclidean or other metric) can be used to generate a confidence score that the uncategorized request is either a malicious request or a legitimate request.

Clustering and identification of centroids of clusters can be done in any suitable way, including a k-means clustering algorithm, a k-medioids clustering algorithm, a k-medians clustering algorithm, a distribution-based clustering algorithm, a density-based clustering algorithm, and the like.

Additionally, various types of filtering and/or manipulation of the parameters A-L can be performed at various suitable times during the process of clustering and bucket generation. For example, a pre-processing step for the parameters A-L can be selective inclusion and/or exclusion based on black-listing or white-listing. Additionally, in some examples, parameters A-L can be genericized and/or scaled in any desirable way before or after a clustering operation.

In one example a call log comprising a set of API calls can be filtered to reduce the fidelity of detail in the set of API calls until a suitable clustering is generated among the parameters of the API calls. Such a filtering can be performed one or more times with different sequence likes. Each parameter can be taken individually and a determination can be made whether a cluster exists for the parameter using k-means clustering, or the like. In other words, a similarity score between the parameters can be identified which can be used to determine whether a cluster is present for that parameter or not. Clusters or buckets can be identified where a similarity score is above a certain defined threshold. A centroid or other center of such a cluster or bucket can then be used as a pattern or a portion of a pattern for identifying malicious requests.

Genericizing one or more request, or a set of requests, can be done in any suitable way. For example, one or more request parameter can be considered to be unimportant or have a range of values, and that value can be weighted accordingly. Clustering and bucketing can be performed again once such a genericizing abstraction is made and the number of requests that fall into that bucket can be determined to inform further genericizing and/or filtering can be performed to further define a pattern for recognizing malicious requests.

In further examples, a pattern for recognizing malicious requests can be based on groups or series of requests. For example, a pair of sequential requests, three sequential requests, four sequential requests, five sequential requests, or any suitable number of sequential requests can be used to generate a pattern for recognizing malicious requests or malicious behavior of a user based on a series of requests. In other words, the characteristics of a series or set of requests can be used to identify a pattern instead of a pattern being based on a single request.

Filtering of one or more pattern, request and/or parameters or characteristics of one or more request can be done in various suitable ways. For example, to guard against false positives where a legitimate user request or set of requests is categorized as being malicious, an anti-pattern can be generated that identifies patterns of legitimate user requests or sets of requests. In other words, the methods of generating patterns to identify malicious requests discussed can be used to generate patterns to identify characteristics that define legitimate user requests or sets of legitimate user requests. With identified patterns for both legitimate and malicious requests or sets of requests, a pattern for legitimate requests or can be subtracted from or used to filter or weight a pattern for malicious requests so that the pattern for malicious requests is less likely to create false positives when testing uncategorized requests or sets of requests.

Figure 13:
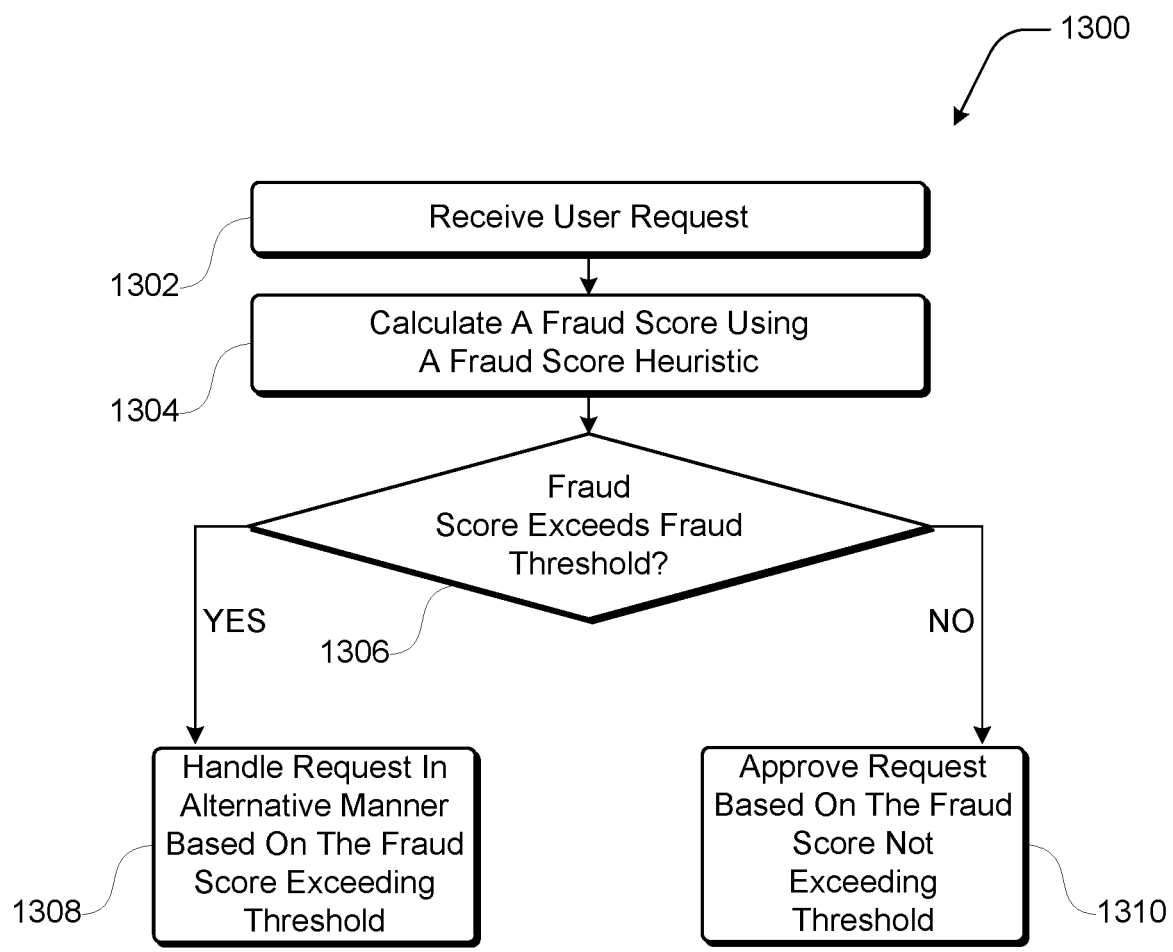
FIG. 13 is a block diagram illustrating an example method of a service denying or approving a user request based on whether the user request exceeds a fraud score threshold or not.

FIG. 13 is a block diagram illustrating an example method 1300 of a service denying or approving a user request based on whether the user request exceeds a fraud score threshold or not. The method 1300 begins where a user request is received 1302 and a fraud score is calculated 1304 using a fraud score heuristic. In one example, a fraud score can be calculated based on how close the characteristics of the request, or a set of requests, matches a pattern for fraudulent requests or sets of requests. Referring to the example above, closeness to a pattern can include a calculation of the distance of subject request or request set characteristics from one or more cluster centroids that define a pattern for malicious requests.

At 1306 a determination is made whether the fraud score exceeds a fraud threshold, and if so, the user request is denied 1308 based on the fraud score exceeding the fraud threshold. On the other hand, if the fraud score does not exceed the fraud threshold, then the user request is approved 1320 based on the fraud score not exceeding the fraud threshold.

Setting a fraud threshold can be done in various suitable ways. For example, where a certain false-positive, false-negative, positive-positive or negative-negative rate is desired, historical data can be used to tune the fraud threshold to generate performance of fraud detection with desired parameters such that the system correctly classifies user requests without allowing too many fraudulent requests to go undetected or denying legitimate users service due to incorrect classification of their requests.

Figure 14:
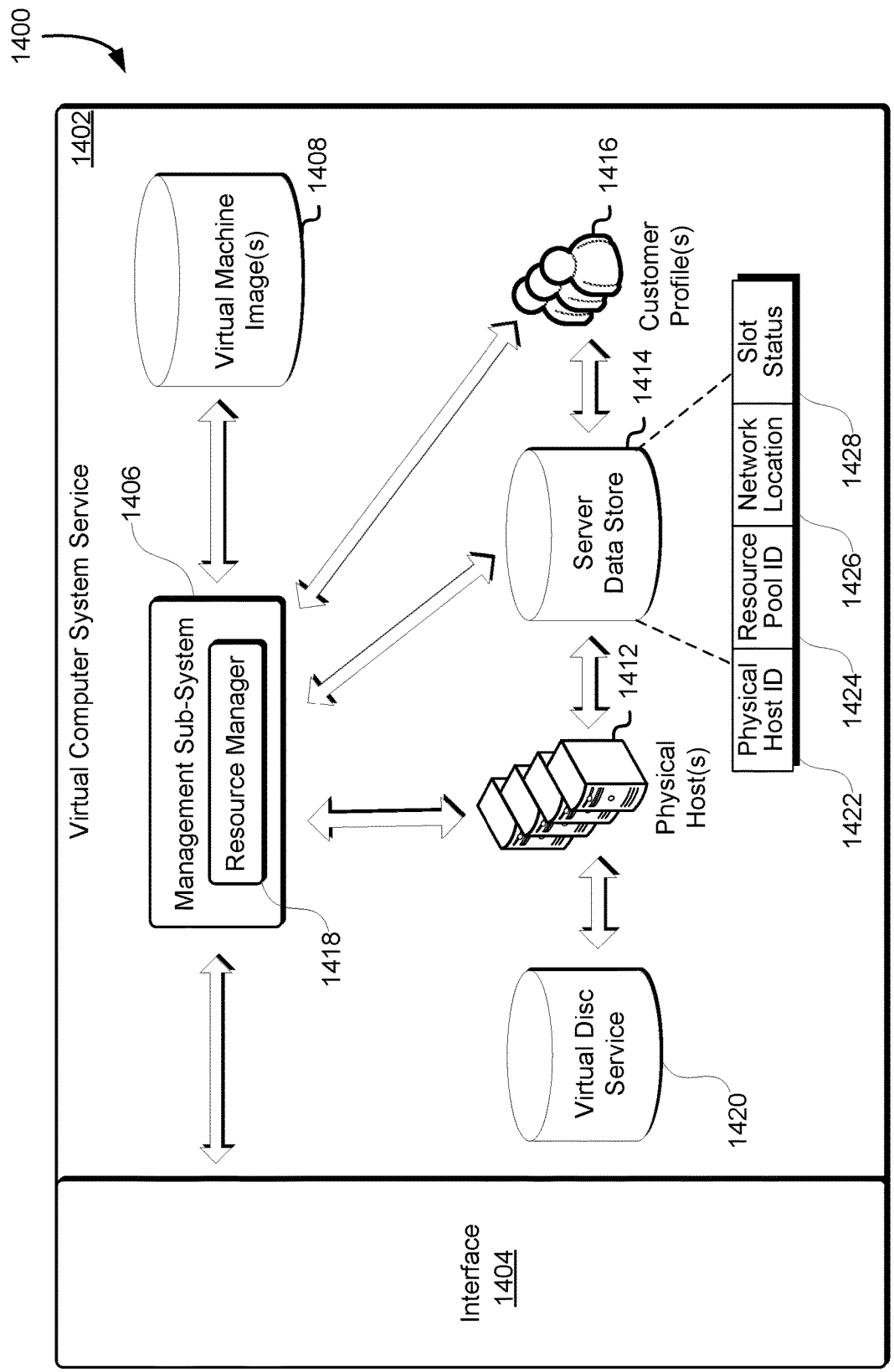
FIG. 14 illustrates an example operating environment of a virtual computing service in accordance with another example.

As noted above, a customer may interact with a virtual computing system service to launch a virtual machine instance within one a physical host. Accordingly, FIG. 14 shows an illustrative example of an environment 1400 in which one or more virtual machine images 1408 are instantiated within one or more virtual hosts 1412 upon customer request in accordance with at least one embodiment. The virtual computer system service 1402 may provide customers with a customer interface 1404 that may enable a customer to access the virtual computer system service 1402.

A customer may utilize the customer interface 1404 through one or more communications networks, such as the Internet. The customer interface 1404 may contain certain security safeguards to ensure that the customer has authorization to access the virtual computer system service 1402. For instance, in order to access the virtual computer system service 1402, a customer may need to provide a username and a corresponding password or encryption key when using the customer interface 1404. Additionally, requests (e.g., API calls) submitted to the customer interface 1404 may require an electronic signature generated using a cryptographic key such that the electronic signature is verifiable by the virtual computer system service 1402, such as by an authorization system (not shown).

Once the customer has gained access to the virtual computer system service 1402 through the customer interface 1404, the virtual computer system service 1402 may allow the customer to interact, through the customer interface 1404, with a management sub-system 1406. For instance, the management sub-system 1406 may enable a customer to remotely provision a virtual machine instance, and the one or more physical host that will instantiate the virtual machine instance can be selected by a resource manager 1418. A customer may use the customer interface 1404 and the management sub-system 1406 to generate a virtual machine instance that includes an operating system and a variety of applications suited to the customer's needs.

The operating system and the various applications may be maintained in data storage in the form of machine images 1408. The virtual computer system service 1402 may maintain a variety of machine images 1408 based on specific customer preferences, as specified in the management sub-system 1406. When a customer submits a request for provisioning a virtual machine instance through the management sub-system 1406, the virtual computer system service 1402 may identify the machine image the customer has requested and allocate the resources necessary (e.g., the processors and random-access memory (RAM) required to operate the components of the machine image) to process the machine image. The machine image may be instantiated on one or more physical hosts 1412 that is operably connected to a virtual disc service 1420 that can provide object level and/or block level memory storage for one or more physical host. 1412.

In one example, a customer, through the customer interface 1404, submits a request to the virtual computer system service 1402 to provision and/or reserve one or more physical host 1412 for his/her virtual machine instances. This request may be submitted through an "AcquireServer" web service or other API call to the service 1402 and may include various parameters such as an account identifier for the customer, virtual machine instance types, information such as a number of processors, amount of memory amount of networking capacity, etc. Additionally, if the customer wishes to reserve a server, the request may be submitted through a "PurchaseReservedServer" web service or other API call to the service 1402.

In response to the request, the management sub-system 1406 may access a server data store 1414 to identify, from a pool of physical hosts 1412 having free capacity, one or more physical host 1412 that may be reserved for the customer to fulfill his/her request, or the like. In some examples, the physical hosts 1412 can be a part of a general pool of resources or a pool of defective resources as discussed above.

In some examples, the virtual computer system service 1402 may maintain a general pool of physical hosts 1412 that the management sub-system 1406 may utilize to identify one or more physical hosts, or a portion thereof, that may be allocated to the customer for use. Once the management sub-system 1406 has identified the one or more physical hosts 1412 to be allocated to the customer, the management sub-system 1406 may access the server data store 1414 to specify, within a database, which physical hosts 1412, or portions thereof have been allocated for use of the customer.

In various examples, the server data store 1414 can store any suitable information about physical hosts 1412, including a physical host identifier 1422, a resource pool identifier 1424 (e.g., whether the resource is part of a general resource pool, a defective resource pool, or the like), a network location 1426, and a slot status 1428.

Once one or more physical hosts 1412 have been allocated for the customer, the customer, through the interface 1404, can submit a request (e.g., "RunInstances" web service or other API call) to the virtual computer system service 1402 to instantiate one or more virtual machine images 1408 onto one of these allocated servers 1412 and/or a portion thereof. For instance, in an embodiment, the customer, through the interface 1404, submits a request to the management sub-system 1406 (e.g., "DescribeServers" web service or other API call) to obtain an identifier for each physical host 1412 allocated for the customer or otherwise being utilized by the customer.

Once the customer has obtained these one or more server identifiers from the management sub-system 1406, the customer may generate a request that may include an identifier corresponding to the physical host(s) 1412 that should be used for instantiating the virtual machine image 1408. The management sub-system 1406 may instantiate the virtual machine image 1408 on the selected physical host(s) 1412, if the physical host(s) 1412 have sufficient capacity to support the virtual machine instance. In some embodiments, the management sub-system 1406 may include a placement server, which may be configured to select from the plurality of servers 1412 a server for the virtual machine instance in a manner that respects a plurality of dedications in the server data store 1414.

Figure 15:
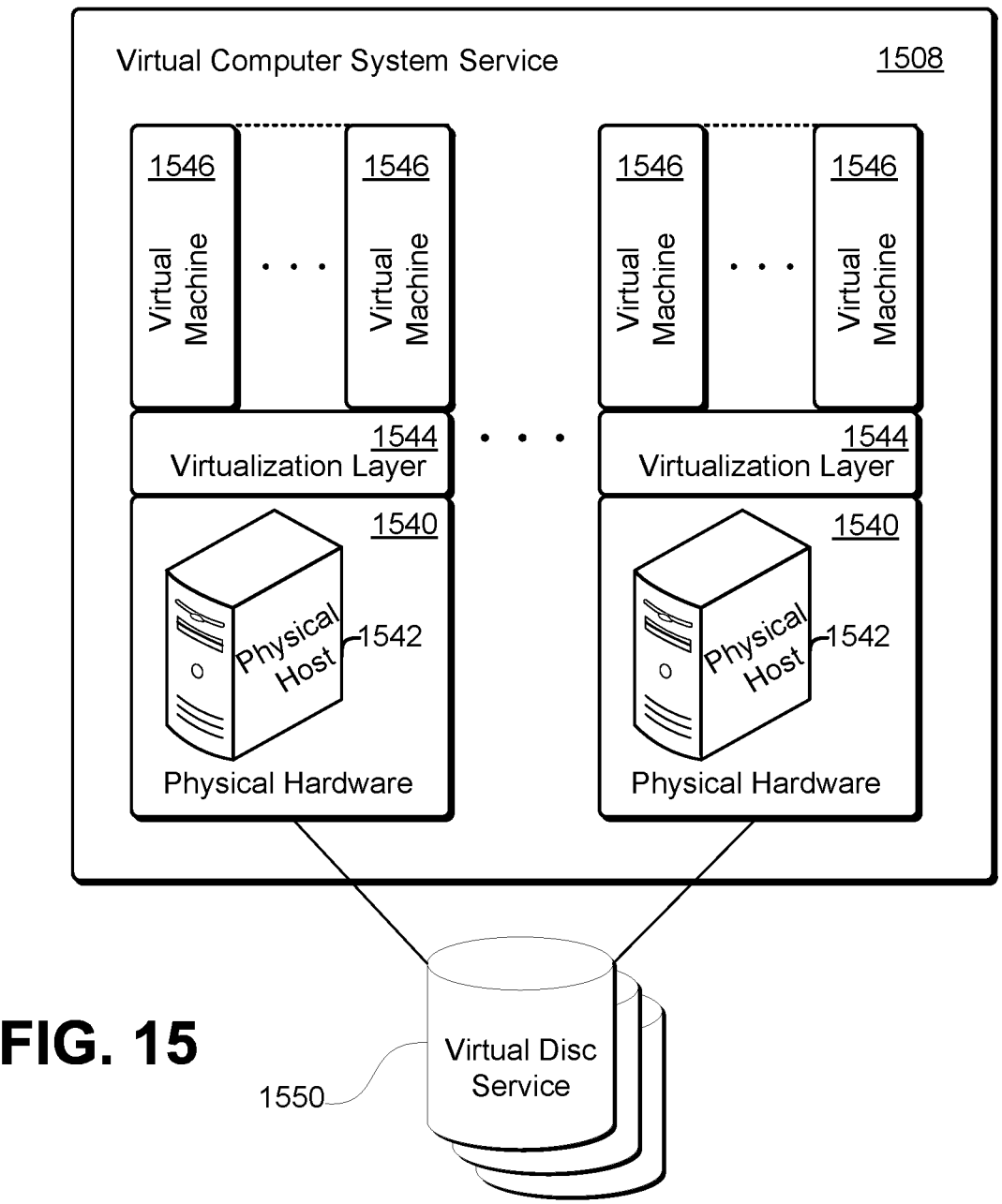
FIG. 15 illustrates a virtual computer system service in accordance with at least one embodiment.

FIG. 15 illustrates a virtual computer system service in accordance with at least one embodiment. The virtual computer system service 1508, which can comprise physical hardware 1540, can be used by a computing resource service provider for providing computation resources for customers. The physical hardware 1540 may include one or more physical hosts 1542. The physical hosts 1542 may be any device or equipment configured to execute instructions for performing data computation, manipulation, or storage tasks, such as a computer or a server.

A physical host 402 may be equipped with any needed processing capability including one or more processors, such as a central processing unit (CPU), a graphics processing unit (GPU) or a digital signal processor (DSP), memory, including static and dynamic memory, buses, and input and output ports that are compliant with any handshaking, communications or data transfer protocol. The physical hardware 1540 may also include storage devices, such as storage disks and tapes, networking equipment and the like and/or can be coupled to virtual disc service 1550.

A virtualization layer 1544 in the computing resources service provider can enable the physical hardware 1542 to be used to provide computational resources upon which one or more virtual machines 1546 may operate. The virtualization layer 1544 may be any device, software, or firmware used for providing a virtual computing platform for the virtual machines 1546. The virtual computing platform 1508 may include various virtual computer components, such as one or more virtual CPUs, virtual memory and the like. The virtual machines 1546 may be provided to the customers of a computing service resource provider and the customers may run an operating system or an application on one or more virtual machines 1546. Further, the computing service resource provider may use one or more of its own virtual machines 1546 for executing its applications. Examples of the virtualization layer 1544 include a hypervisor.

The virtualization layers 1540 can provide a host activity report associated with the physical hardware 1540, one or more physical hosts 1542 or the one or more virtual machines 1546. The host activity report may include utilization, activity or operational information or statistics for the physical hardware 1540, physical hosts 1542, virtual machines 1546 or applications that are executed on the physical hosts 1542 or the virtual machines 1546. The information included in the host activity report may be gathered or compiled over an interval of time or taken at one or more snapshots in time.

Figure 16:
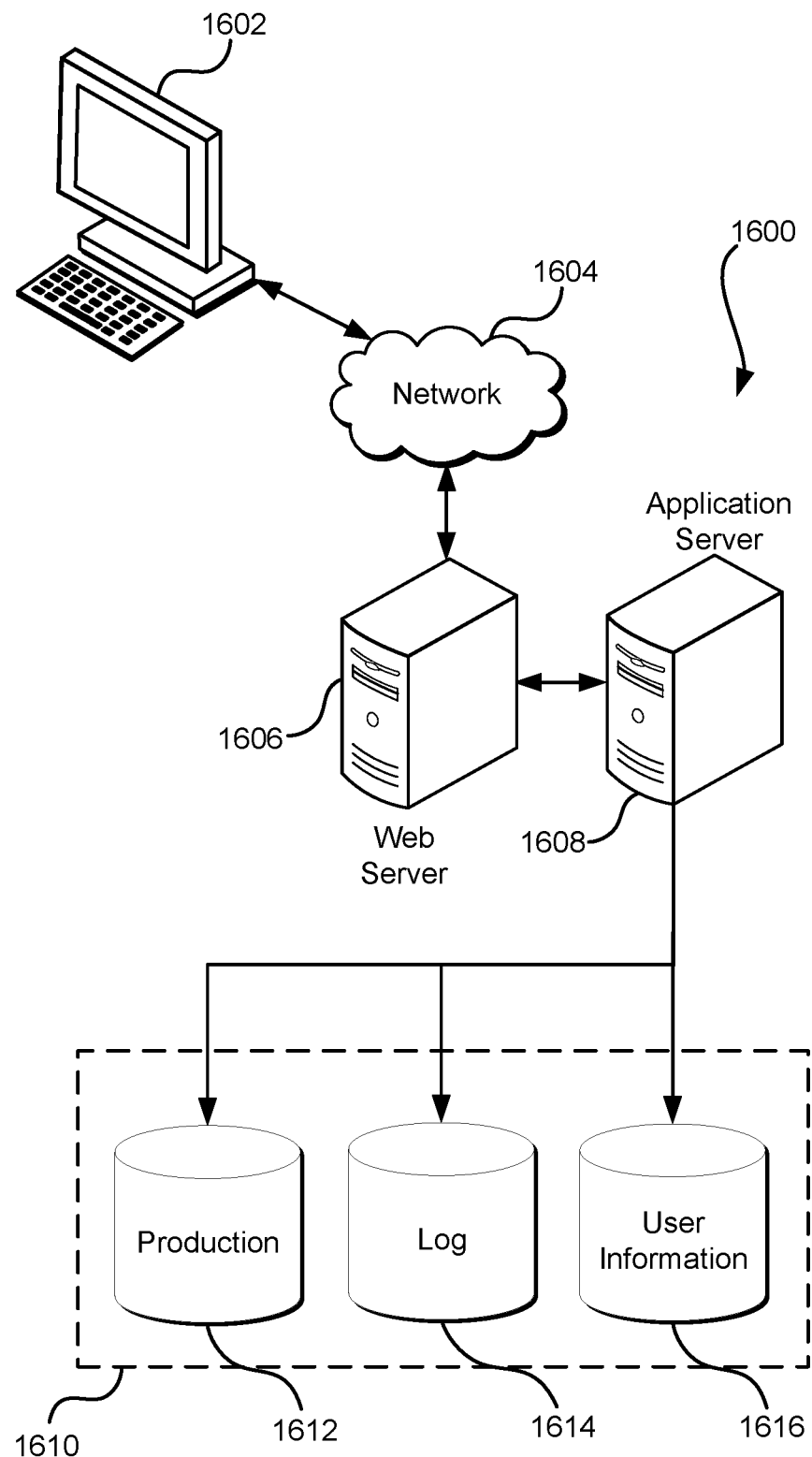
FIG. 16 illustrates an environment in which various embodiments can be implemented.

FIG. 16 illustrates aspects of an example environment 1600 for implementing aspects in accordance with various embodiments. As will be appreciated, although a web-based environment is used for purposes of explanation, different environments may be used, as appropriate, to implement various embodiments. The environment includes an electronic client device 1602, which can include any appropriate device operable to send and/or receive requests, messages, or information over an appropriate network 1604 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 1606 for receiving requests and serving content in response thereto, although for other networks an alternative device serving a similar purpose could be used as would be apparent to one of ordinary skill in the art.

The illustrative environment includes at least one application server 1608 and a data store 1610. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 1602 and the application server 1608, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1610 can include several separate data tables, databases, data documents, dynamic data storage schemes and/or other data storage mechanisms and media for storing data relating to a particular aspect of the present disclosure. For example, the data store illustrated may include mechanisms for storing production data 1612 and user information 1616, which can be used to serve content for the production side. The data store also is shown to include a mechanism for storing log data 1614, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1610. The data store 1610 is operable, through logic associated therewith, to receive instructions from the application server 1608 and obtain, update or otherwise process data in response thereto. The application server 1608 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1602. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 16. Thus, the depiction of the system 1600 in FIG. 16 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C #, or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining a notification of a hardware fault of a first computing resource associated with a general resource pool, the general resource pool comprising computing resources classified as sufficiently operational for servicing legitimate requests;
    assigning the first computing resource to a defective resource pool in response to the obtained notification of the hardware fault, the defective resource pool comprising a group of computing resources classified as operational but insufficiently operational for servicing legitimate requests;
    obtaining a resource allocation request associated with a user device;
    generating a maliciousness score for the resource allocation request;
    determining that the generated maliciousness score exceeds a maliciousness threshold;
    identifying one or more computing resources in the defective resource pool, including the first computing resource associated with the defective resource pool, that are eligible to satisfy the resource allocation request; and
    provisioning honeypot computing services to fulfill the resource allocation request, the provisioning including use of physical hosts associated with the one or more identified computing resources including the first computing resource to instantiate at least one or more virtual machines that provide at least a portion of the honeypot computing services.

2. The computer-implemented method of claim 1, wherein provisioning honeypot computing services comprises instantiating, by the one or more identified computing resources including the first computing resource, the one or more virtual machines to provide at least a portion of the honeypot computing services to satisfy the resource allocation request.

3. The computer-implemented method of claim 1, wherein identifying the one or more computing resources in the defective resource pool that are eligible to satisfy the resource allocation request includes selecting the physical hosts associated with the one or more identified computing resources in the resource pool based at least in part on a defectiveness status associated with the one or more identified computing resources.

4. The computer-implemented method of claim 1, wherein assigning the first computing resource to the defective resource pool includes modifying a database entry to disassociate the first computing resource from the general resource pool and to associate the first computing resource with the defective resource pool.

5. A system, comprising:
    one or more processors; and
    memory with instructions that, as a result of being executed by the one or more processors, cause the system to:
    obtain a resource allocation request;
    classify the resource allocation request as a malicious resource allocation request;
    identify one or more computing resources in a resource pool that is eligible to satisfy the resource allocation request;
    select the one or more identified computing resources in the resource pool based at least in part on a defectiveness status associated with the one or more identified computing resources; and
    provision computing services to fulfill the resource allocation request, the provisioning including use of one or more physical hosts associated with the one or more identified computing resources in the resource pool.

6. The system of claim 5, wherein the system further includes instructions that, as a result of being executed by the one or more processors, cause the system to obtain a notification of a hardware fault associated with a first computing resource associated with a general resource pool and moves the first computing resource to the resource pool in response to the obtained notification of a hardware fault.

7. The system of claim 6, wherein moving the first computing resource to the resource pool includes modifying data to disassociate the first computing resource from the general resource pool and to associate the first computing resource with the resource pool.

8. The system of claim 5, wherein provisioning computing services to fulfill the resource allocation request includes provisioning honeypot computing services and associating a monitoring service with the honeypot computing services to monitor the honeypot computing services.

9. The system of claim 5, wherein the system further includes instructions that, as a result of being executed by the one or more processors, cause the system to calculate an effective time to repair for the computing resources of the resource pool and wherein identifying one or more computing resources in the resource pool that are eligible to satisfy the resource allocation request includes calculating an estimated allocation end-time associated with the request and determining whether the calculated end-time is before an effective time to repair for one or more of the computing resources.

10. The system of claim 5, wherein the system further includes instructions that, as a result of being executed by the one or more processors, cause the system to associate a defectiveness status with a set of computing resources and associates at least a portion of the computing resources to a plurality of computing resource pools having different defectiveness classification and including the resource pool and a general resource pool, based at least in part on the defectiveness status, and wherein identifying the one or more computing resources in the resource pool that are eligible to satisfy the resource allocation request includes selecting the one or more identified computing resources in the resource pool based at least in part on a defectiveness classification associated with the resource pool.

11. The system of claim 5, wherein the resource pool comprises the one or more physical hosts that are in one or more degraded hardware states.

12. A non-transitory computer-readable storage medium including stored thereon executable instructions that, as a result of being executed by one or more processors of a computer system, cause the computer system to at least:
   detect a resource allocation request classified as a malicious allocation request;
   identify one or more computing resources in a resource pool that is eligible to satisfy the resource allocation request;
   select the one or more identified computing resources in the resource pool based at least in part on a defectiveness status associated with the one or more identified computing resources; and
   provision computing services to fulfill the resource allocation request, the provisioning including use of one or more physical hosts associated with the one or more identified computing resources in the resource pool.

13. The non-transitory computer-readable storage medium of claim 12, wherein the instructions further comprise instructions that, as a result of being executed by the one or more processors, cause the computer system to reassociate computing resources from a general resource pool to the resource pool in response to obtained notifications of hardware fault associated with the respective computing resources.

14. The non-transitory computer-readable storage medium of claim 12, wherein the instructions further comprise instructions that, as a result of being executed by the one or more processors, cause the computer system to perform a logical operation, in response to a notification of a hardware fault associated with a first computing resource, to disassociate the first computing resource from a general resource pool and to associate the first computing resource with the resource pool.

15. The non-transitory computer-readable storage medium of claim 12, wherein the instructions cause the computer system to associate an effective time to hardware fault repair with the computing resources of the resource pool.

16. The non-transitory computer-readable storage medium of claim 12, wherein the instructions cause the computer system to determine that satisfying the resource allocation request will allow the one or more computing resources to be released from use in satisfying the resource allocation request within an effective time to hardware fault repair associated with the one or more computing resources.

17. The non-transitory computer-readable storage medium of claim 12, wherein the instructions that cause the computer system to generate a maliciousness score for the resource allocation request further include instructions that as a result of being executed by the one or more processors, cause the computer system to generate the maliciousness score using a fraud score heuristic.

18. The non-transitory computer-readable storage medium of claim 12, wherein the instructions that cause provisioning computing services further comprise instructions that cause provisioning honeypot computing services and association of a monitoring service with the honeypot services to monitor the honeypot computing services.

19. The non-transitory computer-readable storage medium of claim 12, wherein the instructions that cause provisioning computing services further comprise instructions to instantiate one or more virtual machines in the one or more physical hosts that are associated with the resource pool.

20. The non-transitory computer-readable storage medium of claim 12, wherein the instructions that cause provisioning computing services further comprise instructions to provide the one or more computing resources in the resource pool to satisfy a second resource allocation request that exceeds a maliciousness score, wherein the second resource allocation request is a mutating request.

* * * * *